US010409472B2

(12) United States Patent
Lee et al.

(10) Patent No.: US 10,409,472 B2
(45) Date of Patent: Sep. 10, 2019

(54) MOBILE TERMINAL AND METHOD FOR CONTROLLING THE SAME

(71) Applicant: LG ELECTRONICS INC., Seoul (KR)

(72) Inventors: Juhyun Lee, Seoul (KR); Eunsoo Jung, Seoul (KR); Nayeoung Kim, Seoul (KR); Jieun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 249 days.

(21) Appl. No.: 15/380,933

(22) Filed: Dec. 15, 2016

(65) Prior Publication Data

US 2018/0046341 A1     Feb. 15, 2018

(30) Foreign Application Priority Data

Aug. 10, 2016    (KR) .................. 10-2016-0102051

(51) Int. Cl.
*G06F 1/16*      (2006.01)
*G06F 3/0485*    (2013.01)
(Continued)

(52) U.S. Cl.
CPC ............ *G06F 3/0485* (2013.01); *G06F 1/169* (2013.01); *G06F 3/0488* (2013.01);
(Continued)

(58) Field of Classification Search
CPC ................................. G06F 3/0485; G06F 1/169
(Continued)

(56) References Cited

U.S. PATENT DOCUMENTS 5,838,320 A * 11/1998 Matthews, III ..... G06F 3/04855
715/786
6,347,290 B1 * 2/2002 Bartlett ................. G06F 1/1626
702/150
(Continued)

FOREIGN PATENT DOCUMENTS

CN        104133683 A   * 11/2014
KR   1020150130560     11/2015
(Continued)

OTHER PUBLICATIONS

PCT International Application No. PCT/KR2016/014893, Notification of Transmittal of the International Search Report and the Written Opinion of the International Searching Authority, or Declaration dated May 23, 2017, 12 pages.
(Continued)

*Primary Examiner* — Stephen S Hong
*Assistant Examiner* — Broderick C Anderson
(74) *Attorney, Agent, or Firm* — Lee Hong Degerman Kang & Waimey

(57) ABSTRACT

Disclosed are a mobile terminal and a method for controlling the same. The mobile terminal includes a body, a display coupled to the body, a user input unit, a sensing unit configured to sense inclination of the main body relative to reference plane and to sense direction of the inclination, and a controller configured to cause the display to display a first area of a page, to screen-capture the first area when an input is received at the user input unit, and to screen-capture a second area of the page consecutive to the screen-capture of the first area when the page is scrolled in a first direction determined according to the sensed direction of the inclination and while the input is being received at the user input unit, wherein the second area is different from the first area of the page.

16 Claims, 19 Drawing Sheets

(51) Int. Cl.
G06F 3/0481 (2013.01)
G06F 3/0488 (2013.01)
G06F 3/0484 (2013.01)

(52) U.S. Cl.
CPC ...... *G06F 3/04817* (2013.01); *G06F 3/04842* (2013.01); *G06F 3/04883* (2013.01); *G06F 2200/1637* (2013.01); *G06F 2203/04803* (2013.01)

(58) Field of Classification Search
USPC .......................................................... 715/784
See application file for complete search history.

(56) References Cited

U.S. PATENT DOCUMENTS

| | | | | |
|---|---|---|---|---|
| 7,519,468 B2* | 4/2009 | Orr | .................. | G01C 21/36 340/990 |
| 2001/0028368 A1* | 10/2001 | Swartz | .................. | G06F 3/0481 715/835 |
| 2005/0091612 A1* | 4/2005 | Stabb | .................... | G06F 3/0481 715/816 |
| 2011/0102314 A1* | 5/2011 | Roux | ...................... | G06F 15/02 345/156 |

FOREIGN PATENT DOCUMENTS

| | | |
|---|---|---|
| WO | 2014123261 | 8/2014 |
| WO | 2016027923 | 2/2016 |
| WO | 2016108297 | 7/2016 |

OTHER PUBLICATIONS

Smart Device, "Let's learn about new motion functions installed in Galaxy S3," Smart Devices and Mobile Trends Blog, Jun. 2012, 16 pages.

* cited by examiner

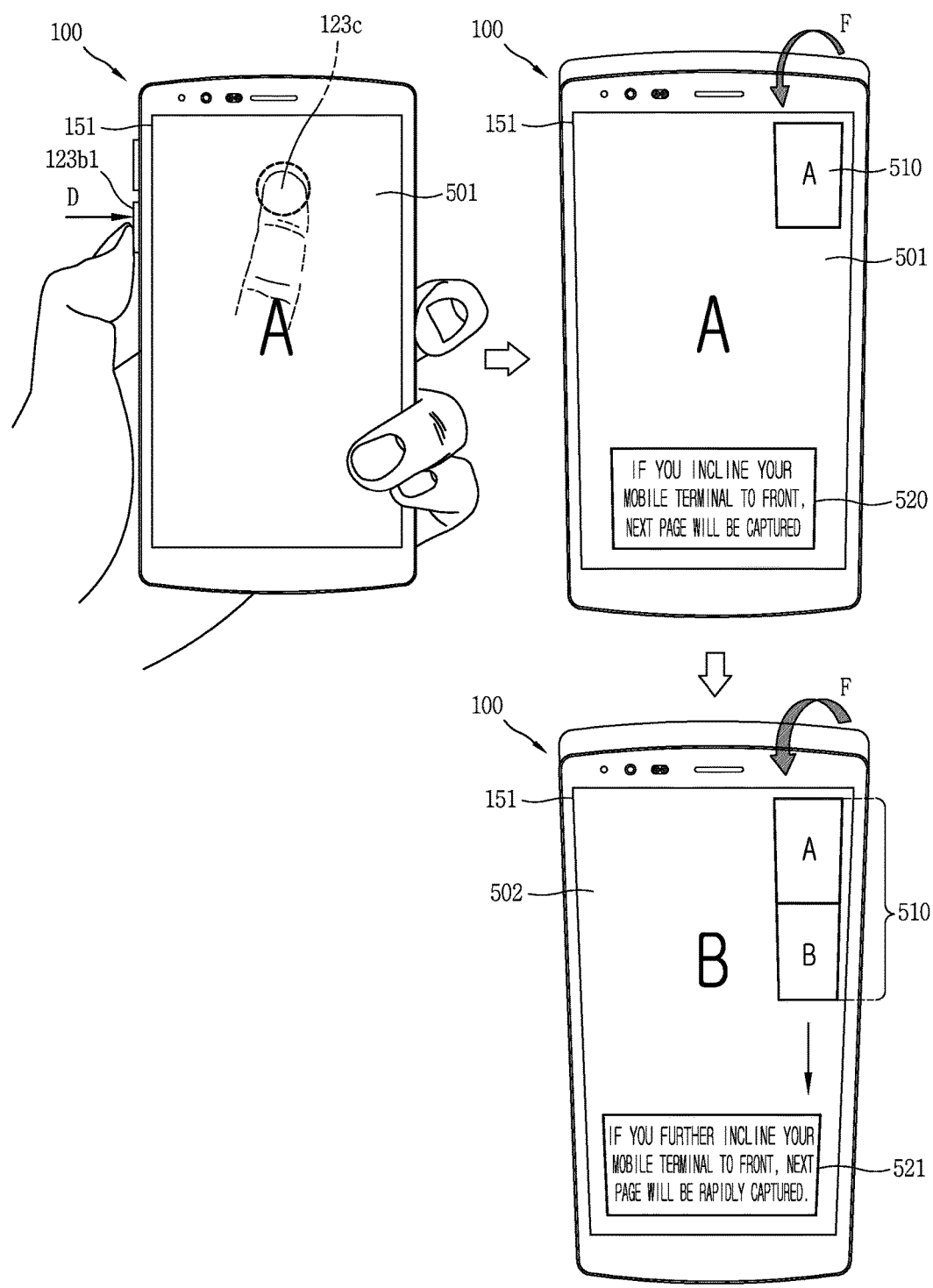

FIG. 7B
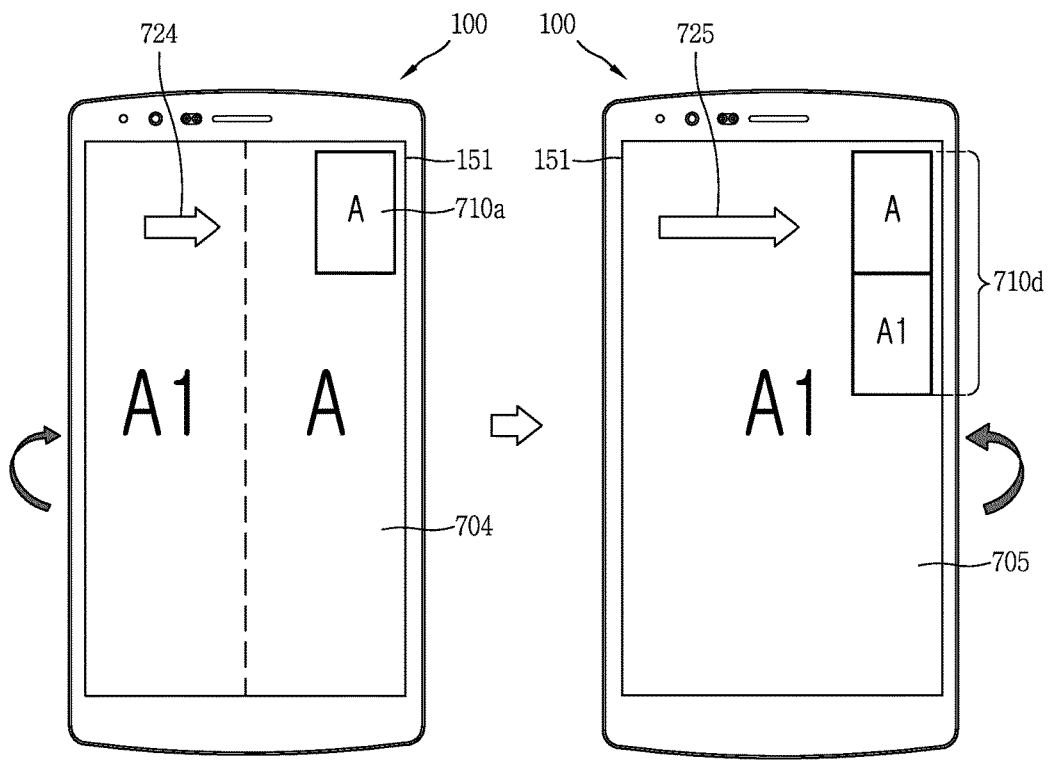
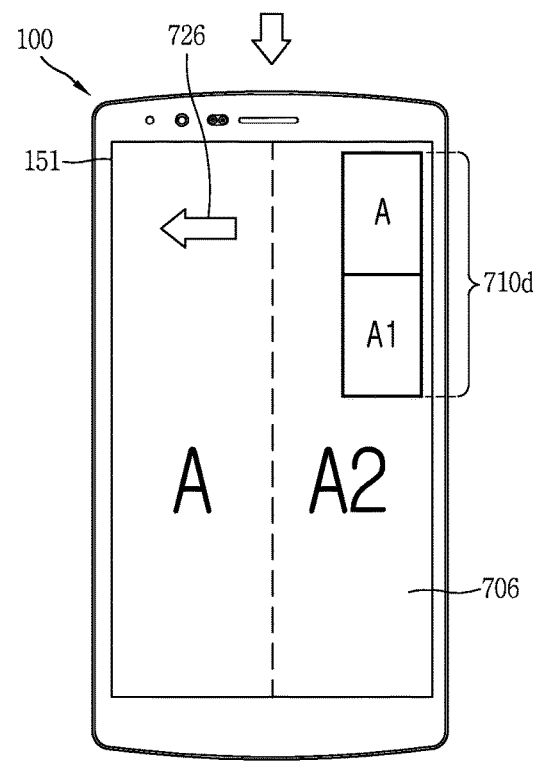

MOBILE TERMINAL AND METHOD FOR CONTROLLING THE SAME

CROSS-REFERENCE TO RELATED APPLICATIONS

Pursuant to 35 U.S.C. § 119(a), this application claims the benefit of earlier filing date and right of priority to Korean Patent Application No. 10-2016-0102051, filed on Aug. 10, 2016, the contents of which are all hereby incorporated by reference herein in its entirety.

BACKGROUND OF THE INVENTION

1. Field of the Invention

The present disclosure relates to a mobile terminal capable of performing a screen capture and a method for controlling the same.

2. Description of the Conventional Art

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions may include data and voice communications, capturing images and video through a camera, recording audio, playing music files through a speaker system, and displaying images and video on a display unit. Some mobile terminals additionally provide functions such as playing an electronic game, or executing a function of multimedia players. Especially, recent mobile terminals may receive multicast signal for providing visual content such as broadcasts, videos, or television programs.

As it becomes multifunctional, a mobile terminal can be allowed to capture still images or moving images, play music or video files, play games, receive broadcast and the like, so as to be implemented as an integrated multimedia player.

With such an improvement, a terminal can display a page. However, the entire area of the page may not be displayed at once on a display unit due to a limitation of the size of the display unit. In this case, there is an inconvenience in that, when the entire area of the page is to be captured, a user should input a capture signal while directly scrolling the page.

In order to solve this inconvenience, there is a plan for consecutively capturing the entire page several times. However, the consecutive capture is possible in only a specific direction, or it is inconvenient for a user to perform a manipulation for the consecutive capture in a desired direction.

SUMMARY OF THE INVENTION

Therefore, an aspect of the detailed description is to provide a mobile terminal that enables a user to consecutively capture the entire page while scrolling the entire page in a desired direction and a method for controlling the mobile terminal.

To achieve these and other advantages and in accordance with the purpose of this specification, as embodied and broadly described herein, a mobile terminal includes: a body; a display coupled to the body; a user input unit; a sensing unit configured to sense inclination of the main body relative to a reference plane and to sense direction of the inclination; and a controller configured to: cause the display to display a first area of a page; screen-capture the first area when an input is received at the user input unit; and screen-capture a second area of the page consecutive to the screen-capture of the first area when the page is scrolled in a first direction determined according to the sensed direction of the inclination and while the input is being received at the user input unit, wherein the second area is different from the first area of the page.

In one exemplary embodiment, wherein the controller is further configured to: screen-capture a third area of the page when the page is scrolled in a second direction determined according to a change in the sensed direction of the inclination and while the input is being received at the user input unit.

In one exemplary embodiment, wherein the screen-capture of the third area does not include any previously captured areas of the page. In one exemplary embodiment, wherein the controller is further configured to: display guide information related to screen capture corresponding to the first direction when the first area of the page is displayed and the input is received at the user input unit.

In one exemplary embodiment, wherein the controller is further configured to: cause the display to consecutively display a plurality of additional areas of the page when the page is continued to be scrolled in the first direction; and screen-capture the plurality of additional areas of the page consecutive to the screen-capture of the first area when the page is continued to be scrolled in the first direction and while the input is being received at the user input unit.

In one exemplary embodiment, wherein the controller is further configured to: stop the screen-capture of the plurality of additional areas when a preset gesture is input during the screen-capture of the plurality of additional areas.

In one exemplary embodiment, wherein the controller is further configured to: cause the display to display an area of the page to be screen-captured next after the preset gesture is input to the body; and restart the screen-capture of the plurality of additional areas when a further preset gesture input is received.

In one exemplary embodiment, wherein the controller is further configured to: vary speed of the scrolling of the page according to a varying degree of the inclination.

In one exemplary embodiment, wherein the controller is further configured to: continue the screen-capture of the plurality of additional areas of the page in the first direction when the input received at the user input unit includes a first key combination; and stop the screen-capture of the plurality of additional areas of the page in the first direction, and screen-capture a plurality of additional areas of the page in a second direction, exclusive of screen-captured additional areas captured in the first direction, when the input received at the user input unit includes a second key combination that is different from the first combination.

In one exemplary embodiment, wherein the controller is further configured to: cause the display to display an image object including a thumbnail representative of at least a portion of the screen-captured plurality of additional areas when the page is scrolled in either the first direction or the second direction.

In one exemplary embodiment, wherein the controller is further configured to: cause the display to change at least one of a displayed position or shape of the image object in response to a change in degree of the sensed inclination or a change in the sensed direction.

In one exemplary embodiment, wherein the controller is further configured to: cause the display to display an image object including a thumbnail representative of at least a portion of the screen-captured plurality of additional areas; stop the scrolling of the page and the screen-capture of the plurality of additional areas of the page when the input at the user input unit is released; and permit user editing to the image object after the stopping of the scrolling of the page and the screen-capture of the plurality of additional areas of the page.

In one exemplary embodiment, wherein the controller is further configured to: cause the display to display an image object including a thumbnail representative of at least a portion of the screen-captured plurality of additional areas; and divide one area of the plurality of additional areas into first and second portions while the page is continued to be scrolled in the first direction, wherein the dividing is in response to a touch received at the display, and wherein the first portion is included in the screen-captured plurality of additional areas and the second portion is not included in the screen-captured plurality of additional areas.

In one exemplary embodiment, wherein the controller is further configured to: cause the display to display a graphic object notifying of direction and degree of the scrolling of the page corresponding to at least one of degree of the inclination or direction of the inclination.

In one exemplary embodiment, wherein the controller is further configured to: cause the display to display another page by turning the page in a lateral direction relative to a viewing orientation in response to a touch input received at the display in the lateral direction; and screen-capture the another page.

In one exemplary embodiment, the mobile terminal further comprises a memory, wherein the controller is further configured to: store in the memory the screen-captured first area and the screen captured second area in response to a received input.

To achieve these and other advantages and in accordance with the purpose of this specification, as embodied and broadly described herein, a mobile terminal includes: a body; a display coupled to the body; an input unit; and a controller configured to: cause the display to display a first area of a page; screen-capture the first area when an input is received at the user input unit; cause the display to scroll the page in a first direction and capture a second area of the page when the received input is a first key combination; and cause the display to scroll the page in a second direction different from the first direction and capture a third area of the page when the received input is a second key combination.

In one exemplary embodiment, wherein the controller is further configured to: stop the scrolling of the page in the first direction and scroll the page in the second direction when the second key combination is input after the first key combination is input.

Further scope of applicability of the present application will become more apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from the detailed description.

BRIEF DESCRIPTION OF THE DRAWING

The accompanying drawings, which are included to provide a further understanding of the invention and are incorporated in and constitute a part of this specification, illustrate exemplary embodiments and together with the description serve to explain the principles of the invention.

In the drawings:

FIGS. 4, 5A, 5B, 6A, 6B, 7A, 7B, 8, 9A, 9B, 10, 11, 12, 13, and 14 are conceptual diagrams illustrating various exemplary embodiments related to a method for capturing a screen while scrolling a page to correspond to an inclined direction of the mobile terminal according to the exemplary embodiment.

DETAILED DESCRIPTION OF EXEMPLARY EMBODIMENTS

Figure 1A:
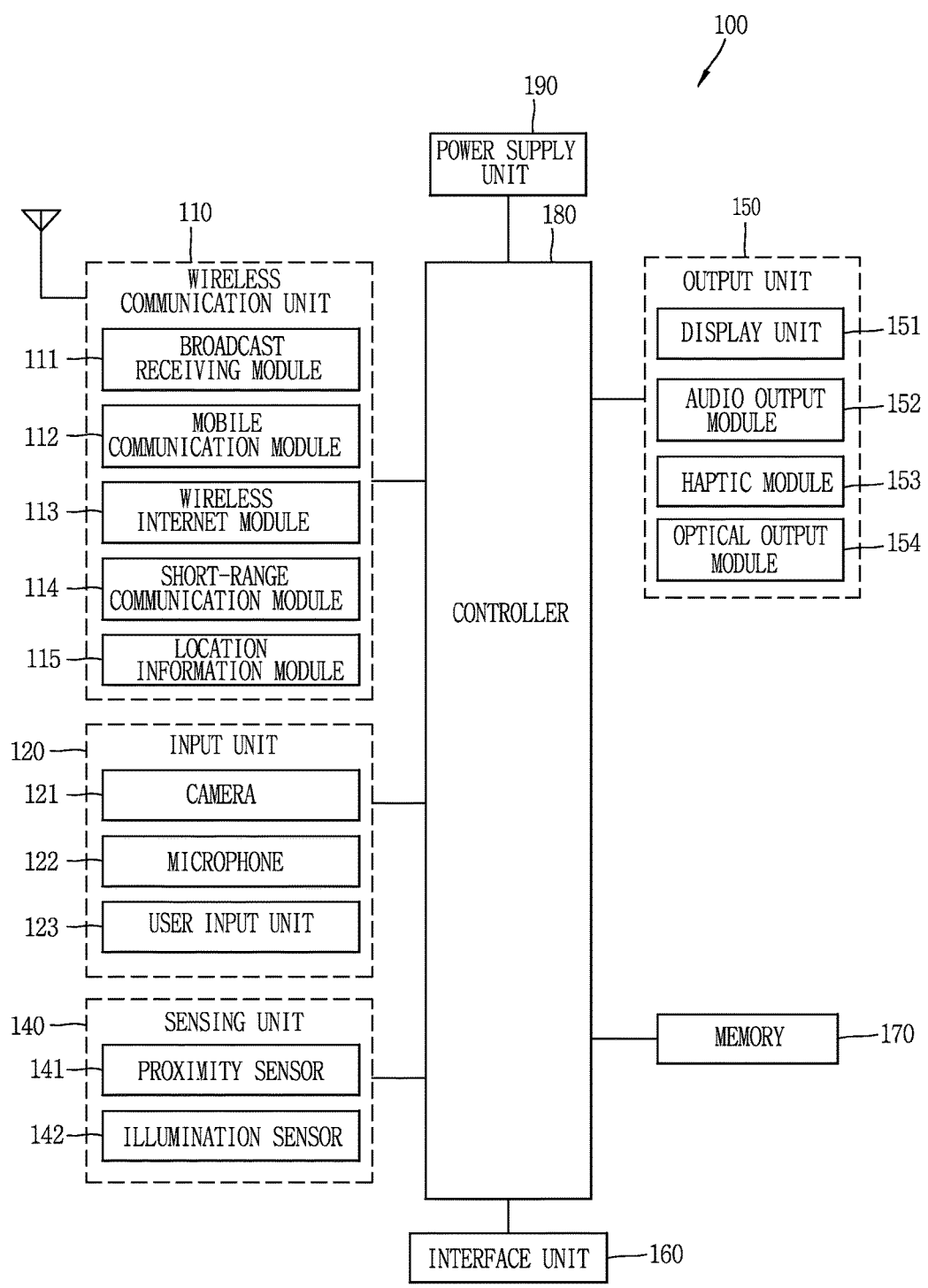
FIG. 1A is a block diagram of a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart glasses), head mounted displays (HMDs), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and a digital signage.

Figure 1B:
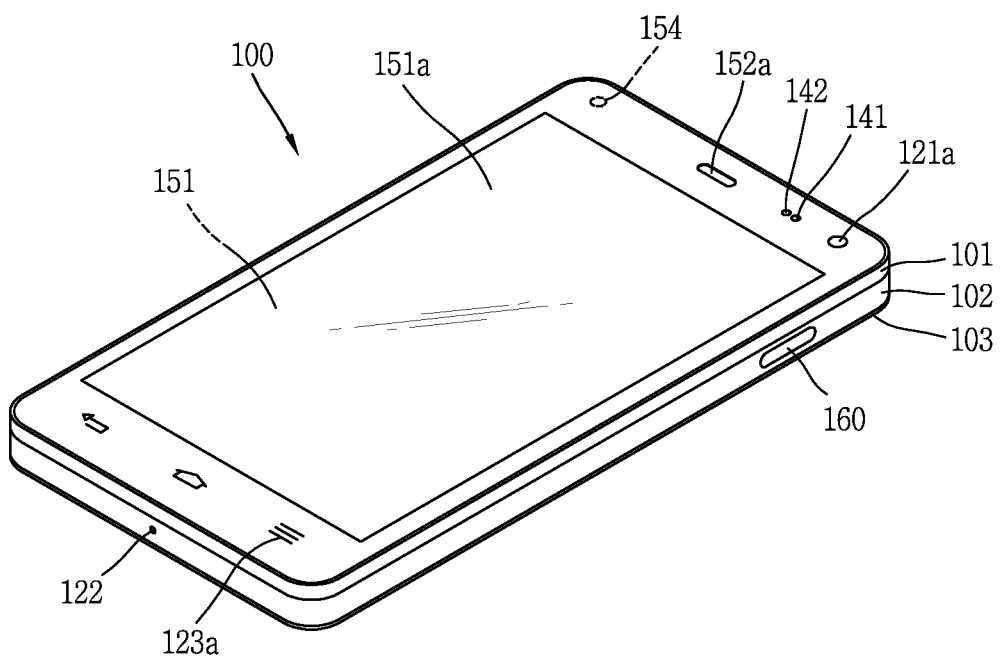
FIGS. 1B and 1C are conceptual diagrams illustrating an example of the mobile terminal, viewed in different directions according to the exemplary embodiment.
Figure 1C:
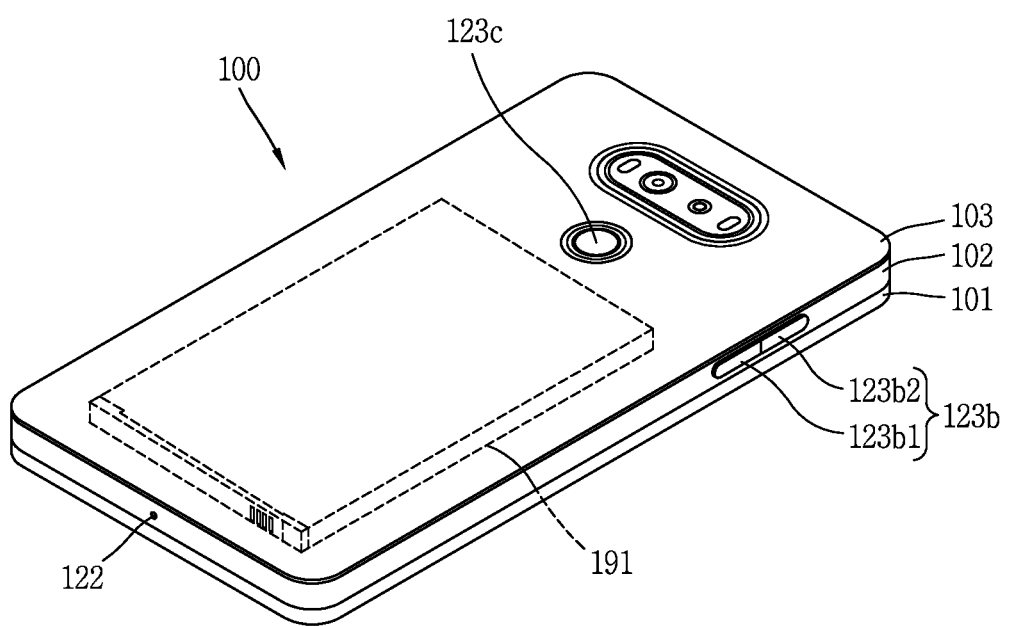

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components of FIG. 1A is not a requirement, and that greater or fewer components may alternatively be implemented.

Referring now to FIG. 1A, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, GSM, CDMA, WCDMA, LTE and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

A magnetic sensor 143 indicates a sensor configured to detect an object approaching a predetermined surface or an object which exists nearby, and a position and a direction of the object, using a force of a magnetic field. That is, the magnetic sensor 143 indicates a sensor configured to measure a size and a direction of a peripheral magnetic field or a line of magnetic force. In the present invention, a plurality of 3-axis magnetic sensors 143*a*, 143*b* are provided at the mobile terminal 100 to more precisely sense a position and a direction of an object which generates a magnetic field.

For this, the plurality of 3-axis magnetic sensors 143*a*, 143*b* may be independent from each other, and may be spaced from each other in different directions. The controller 180 may execute a differentiated operation based on a size of a magnetic field measured by the plurality of 3-axis magnetic sensors 143*a*, 143*b*. More specifically, the controller 180 may detect a position, a direction, an angle, etc. of an object which generates a magnetic field, based on a size of a magnetic field measured by the plurality of 3-axis magnetic sensors 143*a*, 143*b*.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the mobile terminal. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

A third camera 121c may be further provided on a front surface of the terminal body. In this case, the third camera 121c may be disposed near the first camera 121a, or near the opposite side to the first camera 121a (i.e., the optical output unit 154).

The third camera 121c may be provided with a wide angle lens. In this case, the third camera 121c may support a wider viewing angle than the first camera 121a. In a general angle mode, the first camera 121a may be activated for capturing. And in a wide angle mode, the third camera 121c may be activated for capturing. An image captured by the third camera 121c may include a larger number of subjects than an image captured by the first camera 121a. However, in this case, distortion occurs toward a peripheral part of a frame.

The third camera 121c may be activated together with or independently from the first camera 121a when the first camera 121a is activated. If the third camera 121c is activated together when the second camera 121b formed on a rear surface of the terminal body is activated, an image captured by the third camera 121c may be used to compensate for a white balance reference value of an image captured by the first camera 121a.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

Figure 10:
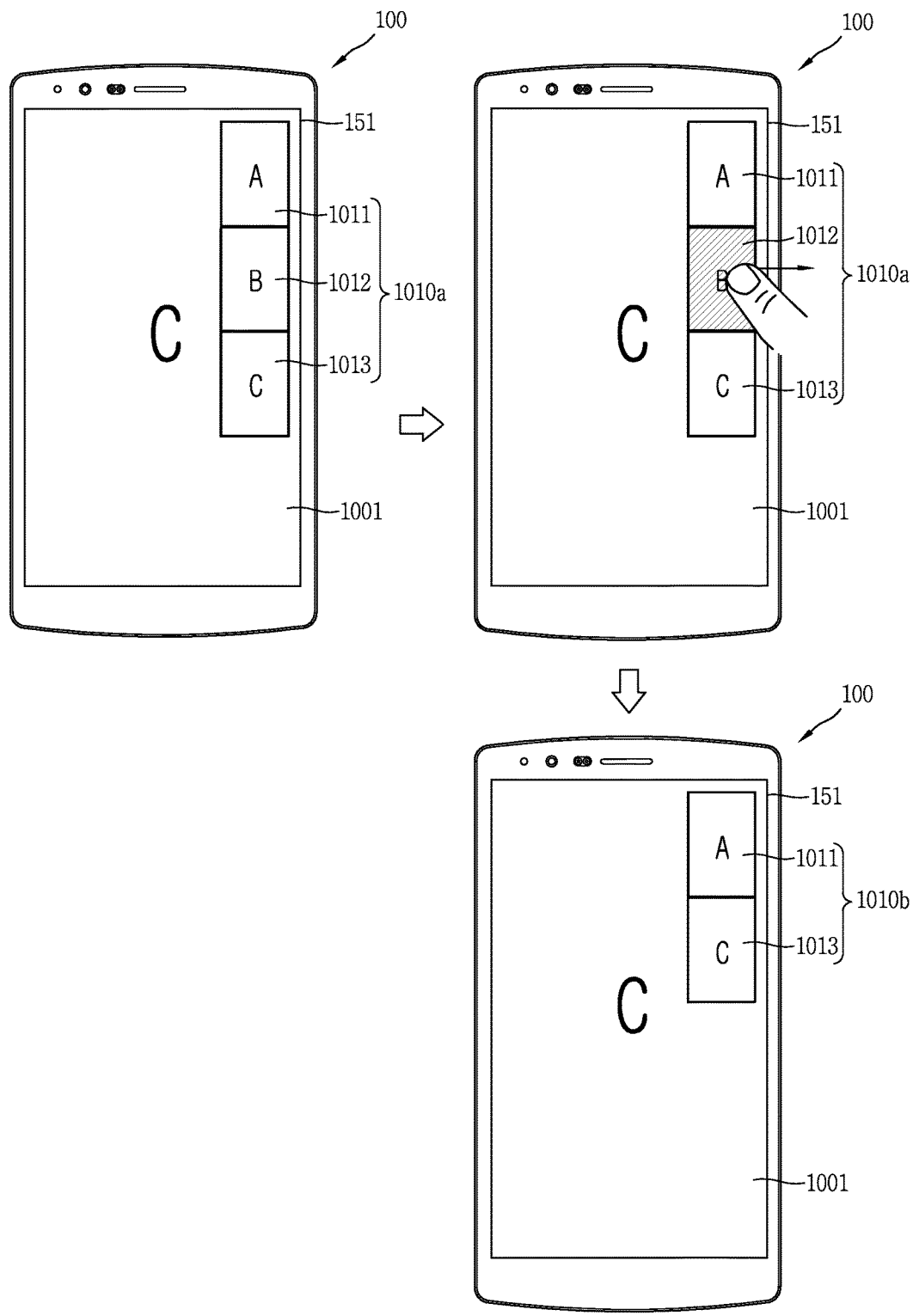

As shown in FIG. 10, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal 100 according to the exemplary embodiment, which includes at least one of the components described above, may receive a key input capable of executing a capture command for a page through the user input unit 123 in a state in which a first area of the page is displayed on the display unit 151. In addition, while the key input is being received as described above, the sensing unit 140 of the mobile terminal 100 may detect an inclination of the main body of the mobile terminal 100 and a direction of the inclination.

Then, if the key input is received, the controller 180 of the mobile terminal 100 first captures the first area currently displayed on the display unit 151, determines a scroll direction corresponding to the detected inclination and the detected direction of the inclination, and then consecutively captures a second area different from the displayed first area while automatically scrolling the page along the determined scroll direction. Here, the second area may be changed depending on the determined scroll direction.

In the present disclosure, the 'page' means a screen that a user can identify while scrolling the screen at least one of top/bottom/left/right directions because the entire page is, in lateral/longitudinal directions, long enough not to be simultaneously displayed on the display unit 151. Therefore, hereinafter, the 'page' may include all kinds of scrollable screens, e.g., scrollable webpage screens, execution screens of other applications, and the like.

Also, in the present disclosure, the 'key input capable of executing the capture command' means a key input using a preset combination of keys provided at least one of front/side/rear surfaces of the mobile terminal 100. For example, when a push input is simultaneously applied to the second manipulation unit 123b provided at the side surface of the mobile terminal 100 and the rear input unit 123c provided at the rear surface of the mobile terminal 100, the push input may be recognized as the key input capable of executing the capture command for the page.

Also, the scroll direction corresponding to the detected inclination and the detected direction of the inclination means a scroll direction of the page, matched to the degree and direction where the mobile terminal 100 is inclined, based on a point of time when the above-described key input is received. For example, if the page is scrollable in the longitudinal direction, and the mobile terminal 100 is inclined to the front while the above-described key input is being received, the page may be scrolled in a forward direction (bottom→top). If the mobile terminal 100 is inclined to the rear while the above-described key input is being received, the page may be scrolled in a reverse direction (top→bottom).

Also, that the page is automatically scrolled along the determined scroll direction means that, when it is determined that the page is scrolled in a specific direction (e.g., the forward/reverse direction), the page is automatically scrolled along the determined scroll direction even though an additional inclination is not detected later. Therefore, that the second area different from the first area is consecutively captured while the page is being automatically scrolled means that the displayed areas are sequentially captured while the page is being scrolled in the determined scroll direction, e.g., the forward direction or the reverse direction.

As described above, in the present disclosure, the user can consecutively capture a page while scrolling the page in a user's desired direction by merely inclining the mobile terminal in a specific direction while a key input for capturing the entire page is being received. Particularly, the user can consecutively capture the page while rolling back the page in the reverse direction by merely inclining the mobile terminal to the rear without any additional input.

Figure 2:
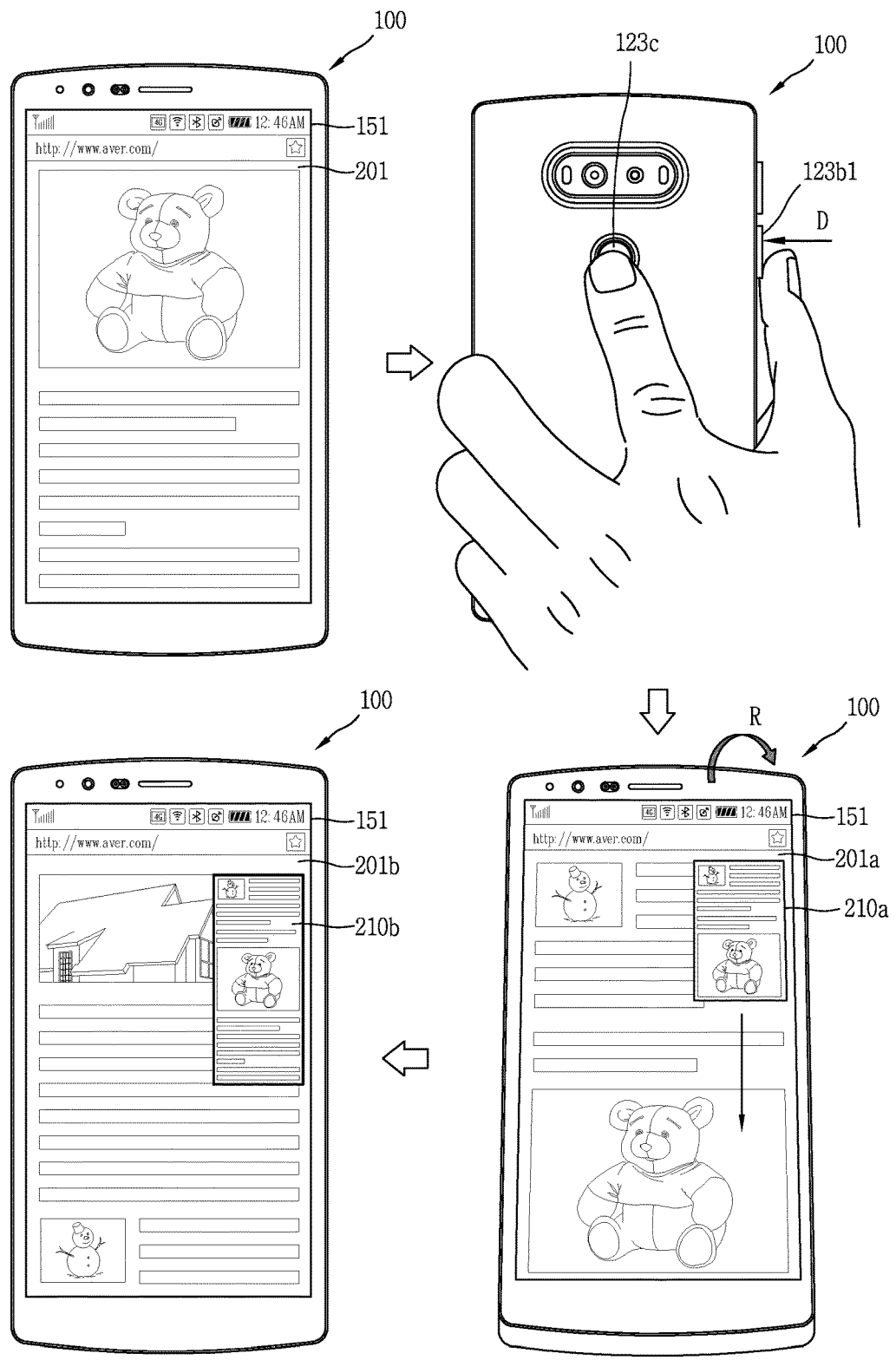
FIG. 2 shows conceptual diagrams illustrating a representative operation of the mobile terminal according to the exemplary embodiment.

Hereinafter, FIG. 2 shows conceptual diagrams illustrating a representative operation of the mobile terminal 100 according to the exemplary embodiment.

A first area 201 included in a specific webpage may be displayed on the display unit 151 of the mobile terminal 100. Here, the specific webpage may be a vertically long screen, and the first area 201 may be a portion of the specific webpage.

In the state in which the first area 201 of the webpage is displayed as described above, a key input for scrolling and capturing the webpage may be received. Specifically, as shown in FIG. 2, if a push input is simultaneously applied to the volume-down key 123b1 provided at the side surface of the mobile terminal 100 and the rear surface key 123c provided at the rear surface of the mobile terminal, the controller 180 of the mobile terminal 100 may recognize the push input as an input of a control command for scrolling and capturing the displayed webpage.

Then, the controller 180 screen-captures the first area 201 displayed on the display unit 151 at the point of time when the push input applied to the plurality of keys 123b1 and 123c are received. After that, if the main body of the mobile terminal 100 is inclined to the rear R with respect to the display unit 151, a control command to automatically scroll the webpage in the reverse direction is generated. Then, the webpage is automatically scrolled in the reverse direction, i.e., from the top to the bottom, at a predetermined speed.

As a result, as the webpage is rolled back, a second area 201*a* that was previously displayed is again displayed on the display unit 151. In addition, a first image object 210*a* including a thumbnail of the screen-captured first area 201 is displayed at a specific position of the second area 201*a*, e.g., a right top edge. The user can recognize a captured portion while viewing the thumbnail 210*a*.

Meanwhile, while the push input applied to the plurality of keys 123*b*1 and 123*c* is being maintained, the webpage is continuously rolled back. Accordingly, a third area 201*b* that was displayed prior to the second area 201*a* is displayed on the display unit 151, and a second image object 210*b* including thumbnails corresponding to the screen-captured first and second areas is displayed in one area of the third area 201*b*.

Here, at least a portion of the first, second, and third areas 201, 201*a*, and 201*b* may include portions overlapping with each other. However, in this case, while the first, second, and third areas 201, 201*a*, and 201*b* are being captured, the first, second, and third areas 201, 201*a*, and 201*b* may be consecutively captured except the overlapping portions, or the overlapping portions in the captured areas may be displayed in the form of a deviant crease line, etc. to attract user's attention.

In addition, the capture is consecutively performed for every first, second, and third regions 201, 201*a*, and 201*b*. Hence, if n different areas are displayed on the display unit 151 while an automatic scroll is being performed, n screen captures may be performed.

In addition, the display order of the thumbnails included in the second image object 210*b* does not correspond to the order in which the corresponding areas are captured, but corresponds to the actual positions of the corresponding areas of the webpage. Specifically, in FIG. 2, the first area 201 of the webpage is first captured, and the second area 201*a* of the webpage is captured later. However, in the second image object 210*b*, the thumbnail of the second area 201*a* captured later is located over the thumbnail of the first area 201. In other words, the connection direction of the captured areas in the image objects 210*a* and 210*b* corresponds to the scroll capture direction of the webpage (i.e., the direction in which the webpage is screen-captured while being automatically scrolled).

Meanwhile, although not shown in this figure, if the scroll capture direction of the webpage is changed, a corresponding change in display is also output to the image object including the thumbnail of the captured area. For example, if the scroll capture direction of the webpage is changed to the forward direction while the webpage is being screen-captured while being automatically scrolled, the thumbnail of the captured area may be continuously connected at a lower side of the image object.

According to the exemplary embodiment described above, a page can be consecutively captured while being automatically scrolled in a user's desired direction by merely inclining the mobile terminal in a specific direction while a preset key input is being received. That is, it is unnecessary that the user should directly scroll the page to capture the entire page. Further, the user can easily perform a consecutive capture on the page in the reverse direction.

Figure 3:
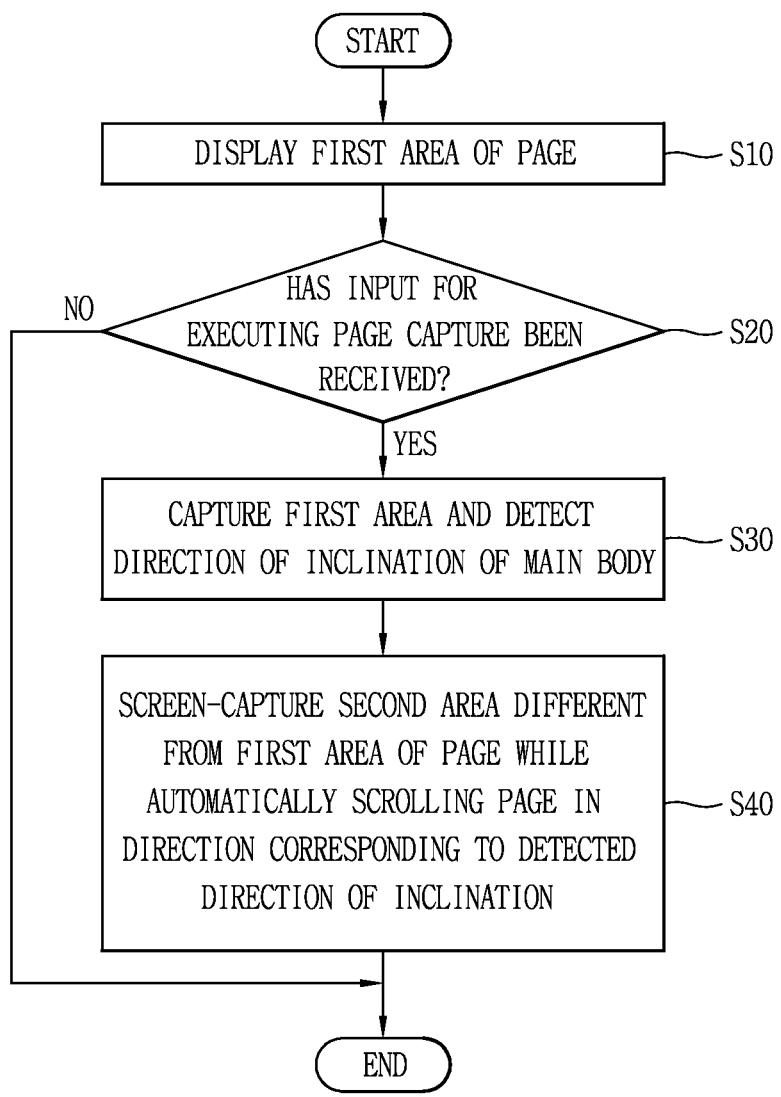
FIG. 3 is a representative flowchart illustrating an operation of the mobile terminal according to the exemplary embodiment.

Next, FIG. 3 is a representative flowchart illustrating an operation of the mobile terminal according to the exemplary embodiment.

First, a first area of the entire page is displayed on the display unit of the mobile terminal 100 (FIG. 1) (S10). Here, the page may be any kind of page that can be scrolled in at least one of a lateral direction and a longitudinal direction. In addition, the first area may be located at the beginning, middle, and last of the page, and corresponds to the beginning area that the user desires to consecutively capture.

In the state in which the first area is displayed as described above, the sensing unit 140 of the mobile terminal 100 may detect whether an input for executing a page capture has been received to the user input unit 123 (FIG. 1) (S20).

Here, the input for executing the page capture may be a push input applied to a combination of a plurality of keys provided in the mobile terminal 100. In addition, the push input applied to a combination of the plurality of keys may be, for example, an input simultaneously applied to the volume-down key provided at the side surface of the mobile terminal 100 and the rear surface key provided at the rear surface of the mobile terminal 100. However, the present disclosure is not limited thereto, and it will be apparent that the push input may be replaced by an input applied to a combination of other keys or a single specific key.

While the input for executing the page capture is being received, an inclination applied to the main body and a direction of the inclination may be detected through the sensing unit 140 (FIG. 1) provided in the mobile terminal 100 (S30). Specifically, the controller 180 may determine a degree to which the main body is inclined to the front/rear/left/right with respect to the display unit 151, based on a sensor value detected by a gyroscope sensor, an acceleration sensor, etc., which is an example of the sensing unit 140.

Then, the controller 180 (FIG. 1) of the mobile terminal 100 may consecutively screen-capture a second area different from the first area while automatically scrolling the page in a direction corresponding to the detected direction of the inclination (S40).

Here, that the page is scrolled means that, when the amount of information included in the page exceeds the amount of one screen of the display unit 151, another area is displayed as one area of the page moves in the top-bottom direction/the left-right direction, based on an input applied from the outside. Therefore, that the page is automatically scrolled means that another area is displayed as one area of the page moves in the top-bottom direction or the left-right direction at a preset speed without any additional input. However, if the input for executing the page capture is released while the page is being automatically scrolled, the auto scroll and the screen capture may be immediately stopped.

Here, the 'second area' different from the first area is changed depending on an auto scroll direction of the page. For example, if the auto scroll direction of the page is a forward direction corresponding to the direction in which information is provided, the second area becomes an area to be displayed next to the first area in the entire page. In addition, for example, if the auto scroll direction of the page is a reverse direction different from the direction in which the information is provided, the second area becomes an area that was displayed just prior to the first area in the entire page.

Meanwhile, when the inclination of the mobile terminal 100 is not detected at all or when the detected inclination is a degree that can be neglected while the input for executing the page capture is being received, the controller 180 may consecutively capture the page while scrolling the page in the forward direction (i.e., the original scroll direction). That is, the forward direction of the page may be set to an initial value of the auto scroll. For example, when the page is scrollable in the left-right direction, and information is displayed from the left to the right, if the inclination of the mobile terminal 100 is not detected, the page is screen-captured while being automatically scrolled in the right direction.

In addition, as described above, while the page is consecutively captured while being automatically scrolled to correspond to the direction of the inclination of the mobile terminal 100, thumbnails of captured areas may be provided in real time to the display unit 151. At this time, a thumbnail of a previously captured area and a thumbnail of a currently captured area are connected to correspond to their positions on the page.

As described above, in the present disclosure, the entire page or a specific section can be consecutively captured in a desired direction by merely inclining the mobile terminal in a desired direction while applying a key input for executing a page capture. Accordingly, the user can intuitively and easily perform a scroll capture without any separate manipulation for directly scrolling the page, consecutively inputting a capture signal, or performing the scroll capture in the reverse direction.

Figure 4:
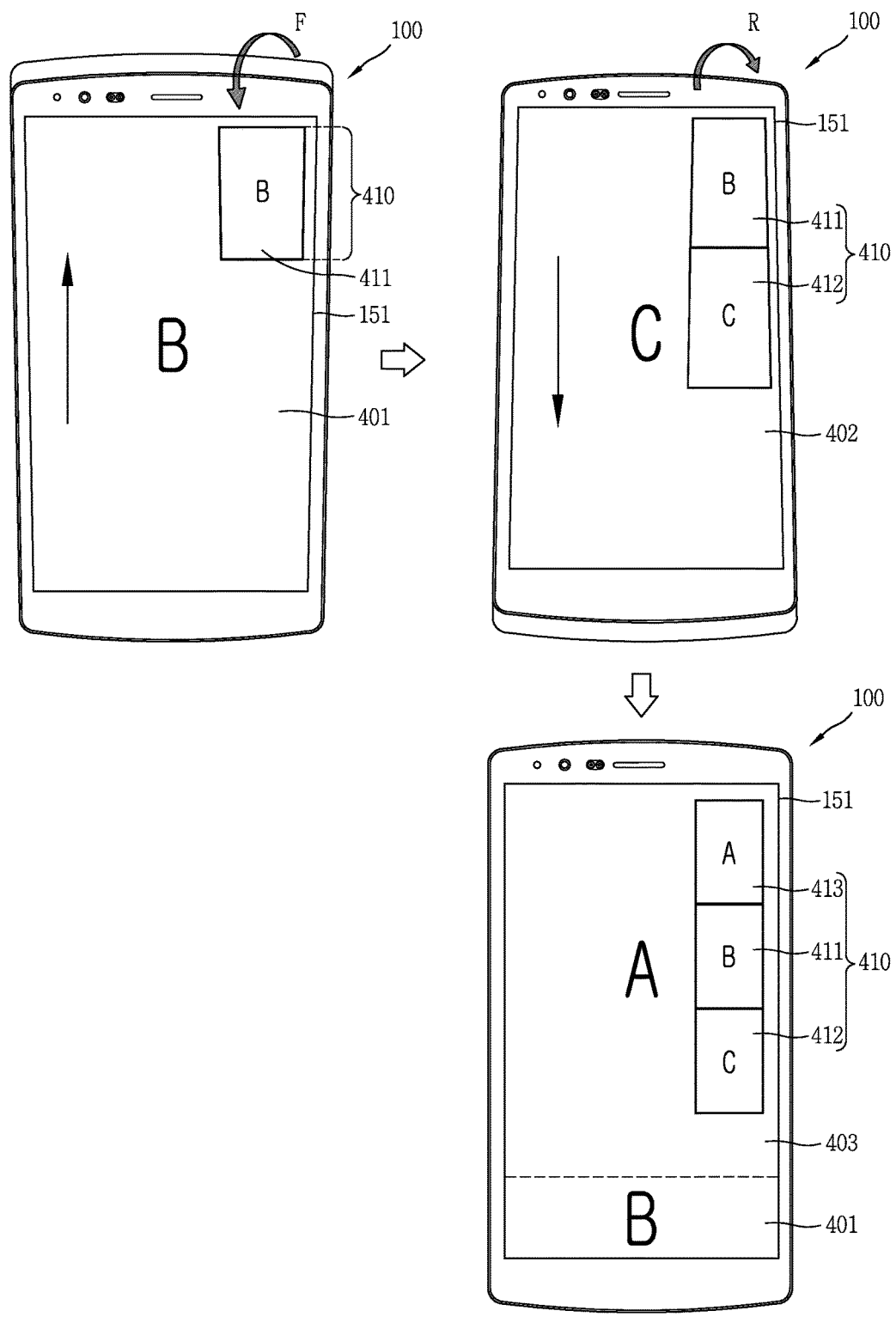

Next, FIG. 4 illustrates an exemplary embodiment of continuously capturing a page by changing an auto scroll direction while the page is consecutively captured while being automatically scrolled.

In FIG. 4, while a key input for executing a page capture is being applied in a state in which a first area B 401 of a page is displayed on the display unit 151 of the mobile terminal 100, if the main body is not inclined or if the main body is inclined to the front F as shown in FIG. 4, the page is consecutively captured while being scrolled in the forward direction. Accordingly, an object 410 including a thumbnail 411 of the captured image B is displayed on the display unit 151, and the page is turned from the first area B 401 to a second area C 402 while being continuously automatically scrolled from the bottom to the top. If the entire second area C 402 is exposed to the display unit 151, the second area C is consecutively captured, and the object 410 is displayed in a form in which a thumbnail 412 of the captured image C is connected to the bottom of the thumbnail 411.

In this case, if the user inclines the mobile terminal 100 to the rear R, the controller 180 of the mobile terminal 100 may recognize that the direction of the inclination of the main body has been changed through a sensor value detected by the sensing unit 140. Then, the controller 180 may resume screen capture on the page by changing the auto scroll direction to a direction corresponding to the changed direction of the inclination.

Meanwhile, while the screen capture is being performed by changing the auto scroll direction, the screen capture of a previously captured area may be limited. Specifically, in FIG. 4, as the auto scroll direction is changed to the reverse direction of the page, i.e., the direction from the top to the bottom, the captured image B is not overlappingly captured even when the first area B 401 is again displayed on the display unit 151.

In addition, although not shown in this figure, when the auto scroll direction is changed during the consecutive capture, the controller 180 may change the auto scroll direction in such a manner that gradually decreases the scroll speed of a current direction ('first direction') and then gradually increases the scroll speed of a changed direction ('second direction'). Accordingly, a seamless operation can be implemented as if a vehicle was moved by a braking distance due to inertia when a brake signal was applied to the vehicle.

After that, if a third area A 403 over the first area B 401 is displayed as the page is continuously automatically scrolled in the reverse direction, the corresponding area A may be consecutively captured. At this time, the object 410 is displayed in a form in which a thumbnail 413 of the captured image A is connected to the top of the thumbnail 411. That is, the display order of the thumbnails of the captured areas, which are displayed in the object 410, corresponds to the display order of the areas on the page, and is applied to a storage order as it is. Thus, it can be seen that the first area B 401 was a start section of the consecutive capture at the beginning, but the third area A 403 has been changed at a start section of the consecutive capture as the auto scroll direction is changed.

As described above, in the present disclosure, the user can easily change the auto scroll direction by inclining the mobile terminal 100 in a specific direction at any time during the consecutive capture. Accordingly, the user can arbitrarily change the beginning section and/or the last section of the consecutively captured page.

Figure 5B:
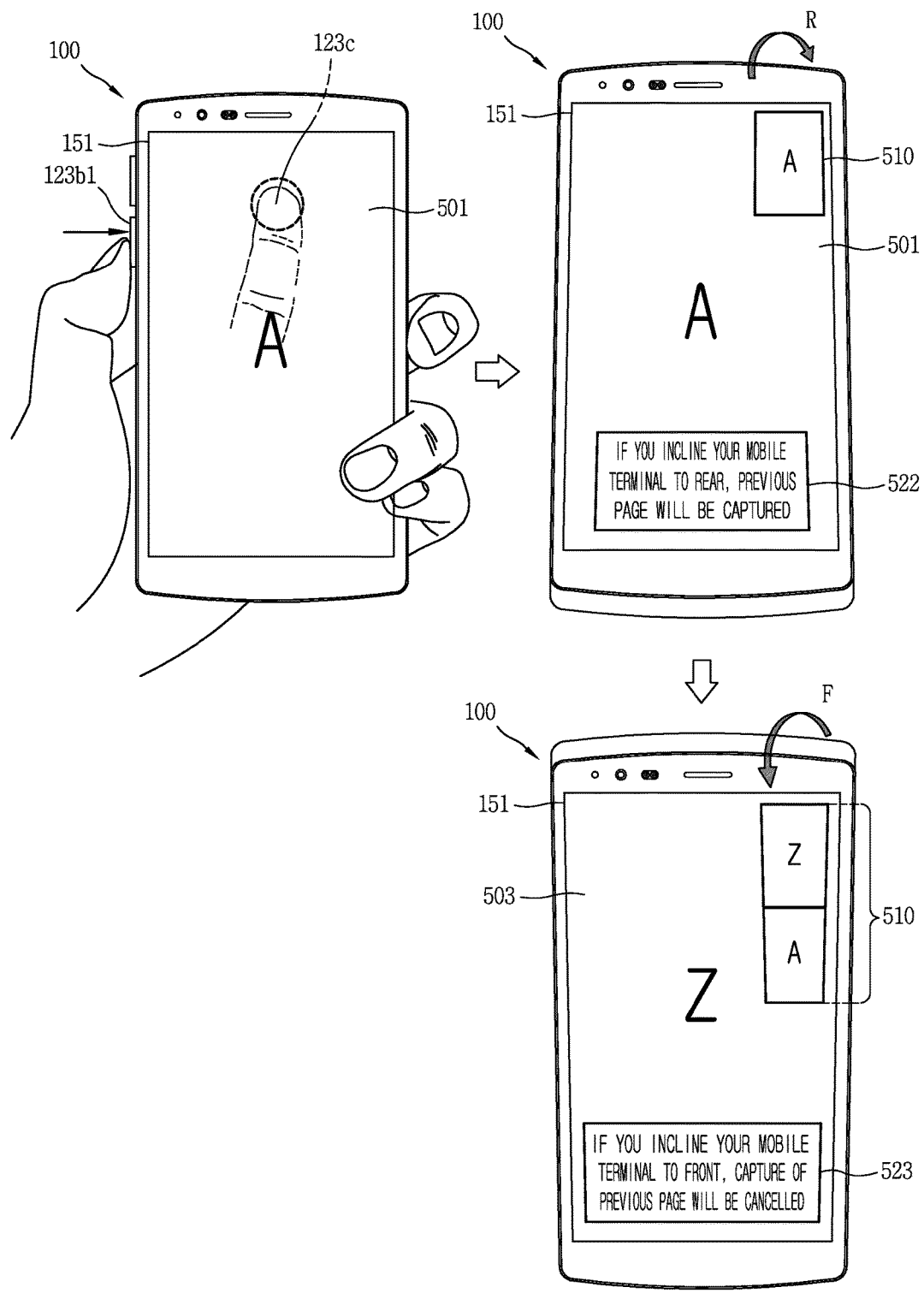

FIGS. 5A and 5B illustrate exemplary embodiments of providing guide information related to that a page is consecutively captured while being automatically scrolled in a desired direction.

First, referring to FIG. 5A, if a push input is simultaneously applied to the volume-down key D 123b1 among the keys provided at the side surface of the mobile terminal 100 and the rear surface key 123c provided at the rear surface of the mobile terminal 100 in a state in which a first area A 501 of a page that is scrollable in the top-bottom direction is displayed on the display unit 151 of the mobile terminal 100, a control signal for executing a consecutive capture of the page is generated.

Then, while the push input applied to the plurality of keys 123b1 and 123c is being maintained, the controller 180 displays, on the display unit 151, guide information related to a screen capture corresponding to the direction of an inclination of the main body, which is detected through the sensing unit 140.

Here, the guide information may be a text or image that informs at least one of the consecutive capture direction and speed of the page. In an exemplary embodiment, the guide information may be restricted to be output only when an inclination of the main body and a direction of the inclination are changed.

In FIG. 5A, if the push input is applied to the plurality of keys 123b1 and 123c, the currently displayed first area 501 is screen-captured, and a thumbnail 510 of the captured area is displayed. After that, in order to consecutively capture the page in the forward direction, initial guide information (e.g., a message of 'if you incline your mobile phone to the front, the next page will be captured') 520 may be popped up in the form of a notification icon in one area of the display unit 151, e.g., a lower end of the display unit 151. However, in another exemplary embodiment, a notification icon guiding that the page can be consecutively captured in the reverse direction may be output as the initial guide information.

For example, if the main body of the mobile terminal 100 is slightly inclined to the front F in response to the popped-up initial guide information, second guide information corresponding to the direction F of the inclination may be output. Here, the second guide information may include information related to the adjustment of the speed of the consecutive capture. For example, as shown in FIG. 5A, a message (e.g., 'if you further incline your mobile terminal to the front, the next page will be rapidly captured') that guides an operation for more rapidly adjusting the speed of the consecutive capture may be displayed. In addition, although not shown in this figure, when the speed of the consecutive capture reaches a preset threshold value as the degree of inclination of the main body is varied, third guide information (e.g., 'the capture is performed at the maximum speed') that notifies that the speed of the consecutive capture has reached the preset threshold value may be popped up.

As another example, as shown in FIG. 5B, if it is detected that the mobile terminal 100 is slightly inclined to the rear R in the state in which the push input is applied to the plurality of keys 123b1 and 123c, fourth guide information (e.g., 'if you incline your mobile terminal to the rear, the previous page will be captured') 522 that notifies that the page can be consecutively captured in the reverse direction may be output.

Meanwhile, if the direction of the inclination of the mobile terminal 100 is changed, for example, from the rear R to the front F while the page is being consecutively captured in the reverse direction, fifth guide information (e.g., 'if you incline your mobile terminal to the front, the capture of the previous page will be cancelled') 523 that notifies that another operation related to the consecutive capture may be executed may be output in one area of the display unit 151. If the direction of the inclination of the mobile terminal 100 is further inclined to the front F in response to the fifth guide information 523, the capture of a just previously captured second area 503 may be cancelled. Therefore, the start section of the consecutive capture may be again changed to the first area 501.

As described above, when a page is consecutively captured, different guide information are provided according to an inclination of the mobile terminal 100 and the direction of the inclination, so that even a user who is not good at terminal manipulation can easily perform the consecutive capture of a page.

Figure 6A:
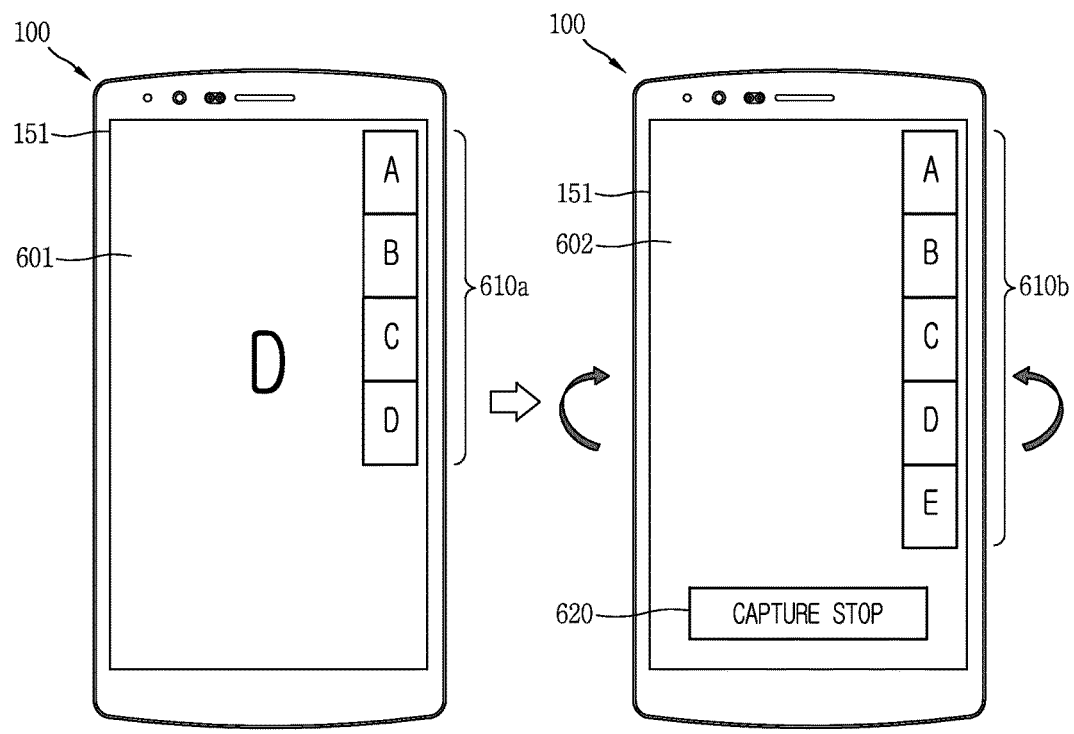
Figure 6B:
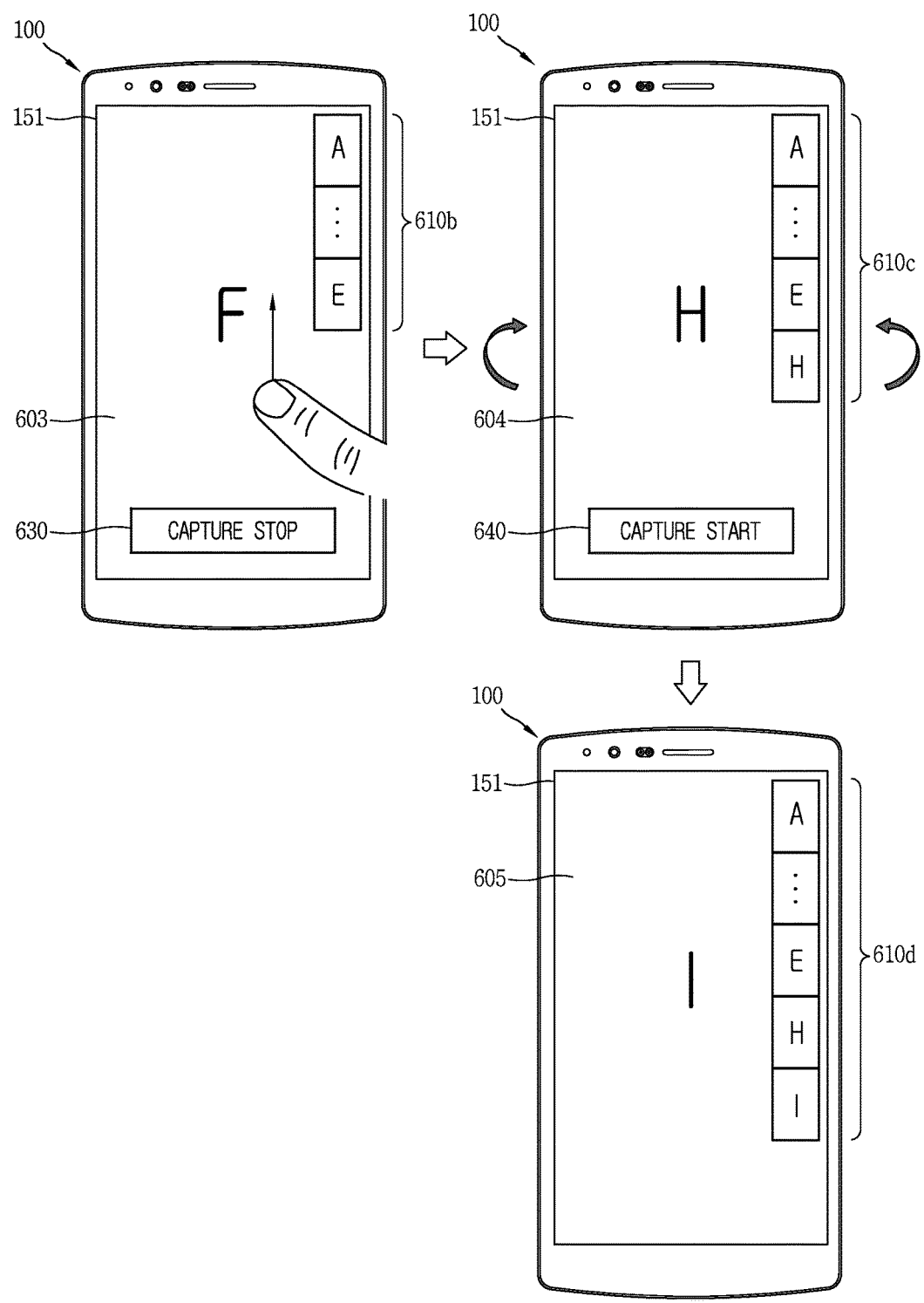

Hereinafter, FIGS. 6A and 6B illustrate an exemplary embodiment of stopping a consecutive capture of a page in a specific section or resuming the stopped consecutive capture from a desired section.

First, in relation to FIG. 6A, there is a case where the user may capture the last of a page as an end section while scrolling the page in the forward direction using a first area A of the page as a start section of a consecutive capture, but desires to perform the consecutive capture only up to a specific section of the page.

For example, in FIG. 6A, if a tilting gesture in the left-right direction is applied as a preset gesture to the mobile terminal 100 in a state in which the page is consecutively captured from the first area A to a fourth area D, and a fifth area E of which consecutive capture is to be stopped is then displayed on the display unit 151, the consecutive capture is stopped in the fifth area E. In addition, a notification icon 620 (e.g., 'capture stop') which notifies that the consecutive capture has been stopped may be displayed at a lower end of the display unit 151. Accordingly, the user can stop the consecutive capture in a desired section without capturing the entire from the first area to the end/start of the page, which is a time section of the consecutive capture.

Meanwhile, if a touch is applied to the notification icon 620, the temporarily stopped consecutive capture may be completely ended. In this case, although a key input for executing a page capture is maintained, the consecutively captured areas may be finally confirmed as the first area A to the fifth area E.

Next, in relation to FIG. 6B, there is a case where the user desires to capture, as one image, another inconsecutive section or another page in a section in which the consecutive capture is stopped. To this end, it is assumed that the stop of the consecutive capture in the exemplary embodiment of FIG. 6A does not mean that the consecutive capture is ended but means that the consecutive capture is temporarily stopped.

The controller 180 may perform an operation corresponding to a touch input applied to the display unit 151 even while the consecutive capture is being stopped. For example, in FIG. 6B, as a flicking touch input is applied to the display unit 151 in a top/bottom/left/right direction while the consecutive capture is being stopped (630), the page may be scrolled to correspond to the flicking direction. For example, if the flicking touch input is applied in the top direction, a seventh area H 604 may be displayed as a sixth area F 603 of the page is scrolled.

In this case, the displayed seventh area H 604 may be referred to as an area to be consecutively captured next time. As described above, in an exemplary embodiment, an operation corresponding to the touch input applied to the display unit 151 may be performed even while the auto scroll and screen capture of the page are being stopped, and an area to be consecutively captured next time may be searched and output based on a touch input.

If a preset gesture, e.g., a tilting gesture in the left-right direction is applied to the mobile terminal 100 in the state in which the area H 604 to be captured next time, the stopped consecutive capture is resumed. Accordingly, the consecutive capture is resumed by connecting the seventh area H next to the fifth area E. That is, the stop of the auto scroll and screen capture is released, and the consecutive capture is continuously performed from the selected seventh area H 604. In this case, a notification icon (e.g., 'capture start') which notifies that the continuous capture has been resumed may be popped up and then disappeared at a lower end of the display unit 151. In addition, a next area, i.e., an eighth area I 605 is consecutively captured while the page is being automatically scrolled in the forward direction.

Meanwhile, in the above, the case where a plurality of sections that are not connected to one page are consecutively captured has been described as an embodiment. However, the consecutive capture may be continuously performed using only a preset gesture input by searching for another page or a specific screen of another application while the consecutive capture is being stopped.

Figure 7A:
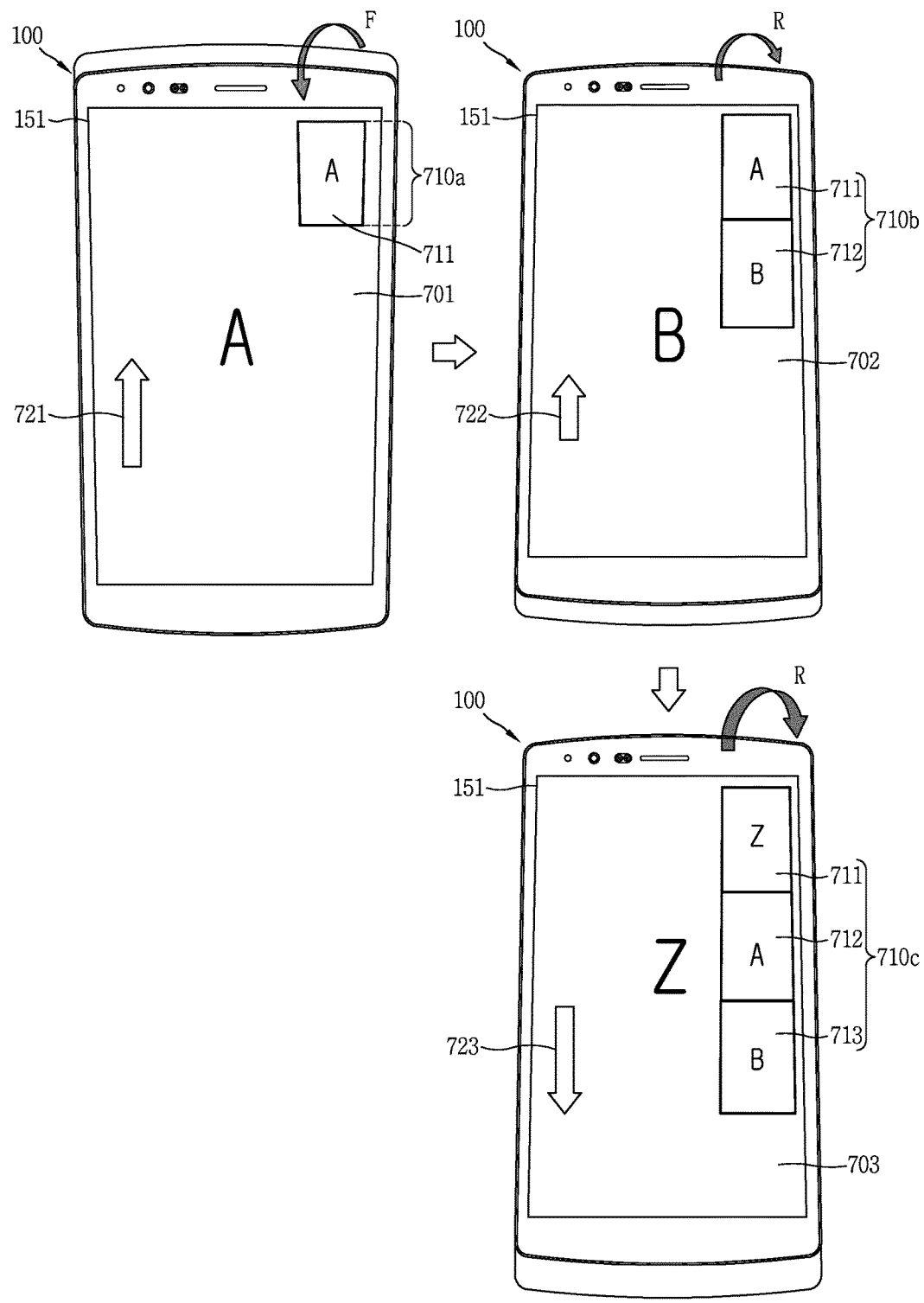

Next, FIGS. 7A and 7B illustrate exemplary embodiments in which as the degree of inclination of the main body or the direction of the inclination is varied, information on a changed speed or direction of a consecutive capture is provided to a screen.

In the exemplary embodiment, if it is detected that degree of inclination of the main body is varied through the sensing unit 140 while a page is being screen-captured while being scrolled, the controller 180 of the mobile terminal 100 may perform a screen-capture by varying the scroll speed of the page to correspond to the varied degree of inclination.

Here, whether the degree of inclination of the main body has been varied may be identified by comparing an initial sensor value detected by the sensing unit 140 at a point of time when a key input for executing a page capture is applied with a change in sensor value continuously detected while the consecutive capture is being performed.

Specifically, as an example, if the mobile terminal 100 is further inclined in a direction corresponding to the scroll direction of the page, the scroll and capture speed of the page may increase. As another example, if the mobile terminal 100 is inclined in a direction opposite to the scroll direction of the page, the scroll and capture speed of the page may gradually decrease, and the scroll direction of the page may be then changed to corresponding to the changed direction, thereby performing the consecutive capture.

In addition, the controller 180 may display, in one area of the display unit 151, a graphic object that notifies a degree of scroll and a direction of the page, corresponding to at least one the degree of inclination of the main body and the direction of the inclination while the page is being screen-captured while being scrolled.

In FIG. 7A, if the mobile terminal 100 is inclined to the front F when a page is consecutively captured, a first area A 701 of the page is captured and then moves to the top. Accordingly, a second area B 702 of the page appears. In this case, a graphic object 721 notifying a current scroll direction and speed of the page may be output. Here, a direction indicated by the graphic object 721 may be represented as the scroll direction, and a size indicated by the graphic object 721 may be represented as the scroll speed. In FIGS. 7A and 7B, an arrow image has been illustrated as the graphic object notifying the scroll degree and scroll direction of the page. However, the present disclosure is not limited thereto, and the graphic object may be modified in various shapes. The scroll direction and speed for a consecutive capture may be represented by changing the color, 3D depth, etc. of the image, instead of the direction or size indicated by the image.

If the direction of the inclination of the mobile terminal 100 is changed from the front F to the rear R, the scroll speed of the page is gradually decreased before the direction of the consecutive capture is first changed. Accordingly, the length of the graphic object 721 is also decreased in proportion to the decreased scroll speed (722). After that, if the mobile terminal 100 is further inclined to the rear R, an image object 723 of which direction is changed is displayed on the display unit 151.

Accordingly, the user can intuitively know a current scroll direction and speed of the page by viewing an image object.

FIG. 7B is an exemplary embodiment in which, in the case of a page scrollable in the left-right direction, such as 'story news' that the user views while scrolling pages in the left-right direction, a graphic object notifying a scroll degree and direction of a page corresponding to at least one of an inclination of the main body and a direction of the inclination is output while the page is screen-captured while being scrolled.

As shown in FIG. 7B, if a tilt is applied to a left side with respect to the display unit 151 of the mobile terminal 100 when a page is consecutively captured, a portion of a second area A1 is exposed (704) as a first area A of the page is turned from the left to the right. That is, the page is scrolled in the right direction such that the second area A1 located at the left of the first area A is displayed. In this case, an image object 724 notifying a scroll direction (right direction) corresponding to the direction (left direction) in which the tilt is applied and a degree to which the tilt is applied may be displayed in one area of the display unit 151, e.g., at a top end of the display 151.

If the second area A1 is entirely exposed while the page is being scrolled in the right direction, the corresponding area is continuously captured. In this case, the connection direction of a thumbnail of the captured image A1 and a thumbnail of the previously captured image A may not correspond to the connection direction of an actual area. That is, the areas A1 and A are located side by side in the lateral direction on the page in FIG. 7B, but the thumbnails of the captured images may be connected in the longitudinal direction (710*d*).

After that, if a tilt is applied to a right side with respect to the display unit 151 while the page is consecutively captured while being scrolled in the right direction, an image object 726 notifying a scroll direction (left direction) corresponding to the direction (right direction) in which the tilt is applied and a degree to which the tilt is applied is displayed, and a portion of a third area A2 located at the right of the first area A is exposed (706). After that, if third area A2 is entirely exposed, the consecutive capture is performed.

Meanwhile, in the above, the case where one page scrollable in the left-right direction is consecutively captured has been described as an example. However, an execution screen of another tab of a corresponding application may be consecutively captured by applying a tilt in the left-right direction in a page scrollable in only the top-bottom direction, or may be rapidly consecutively captured by moving to another application different from the currently executed application.

Figure 8:
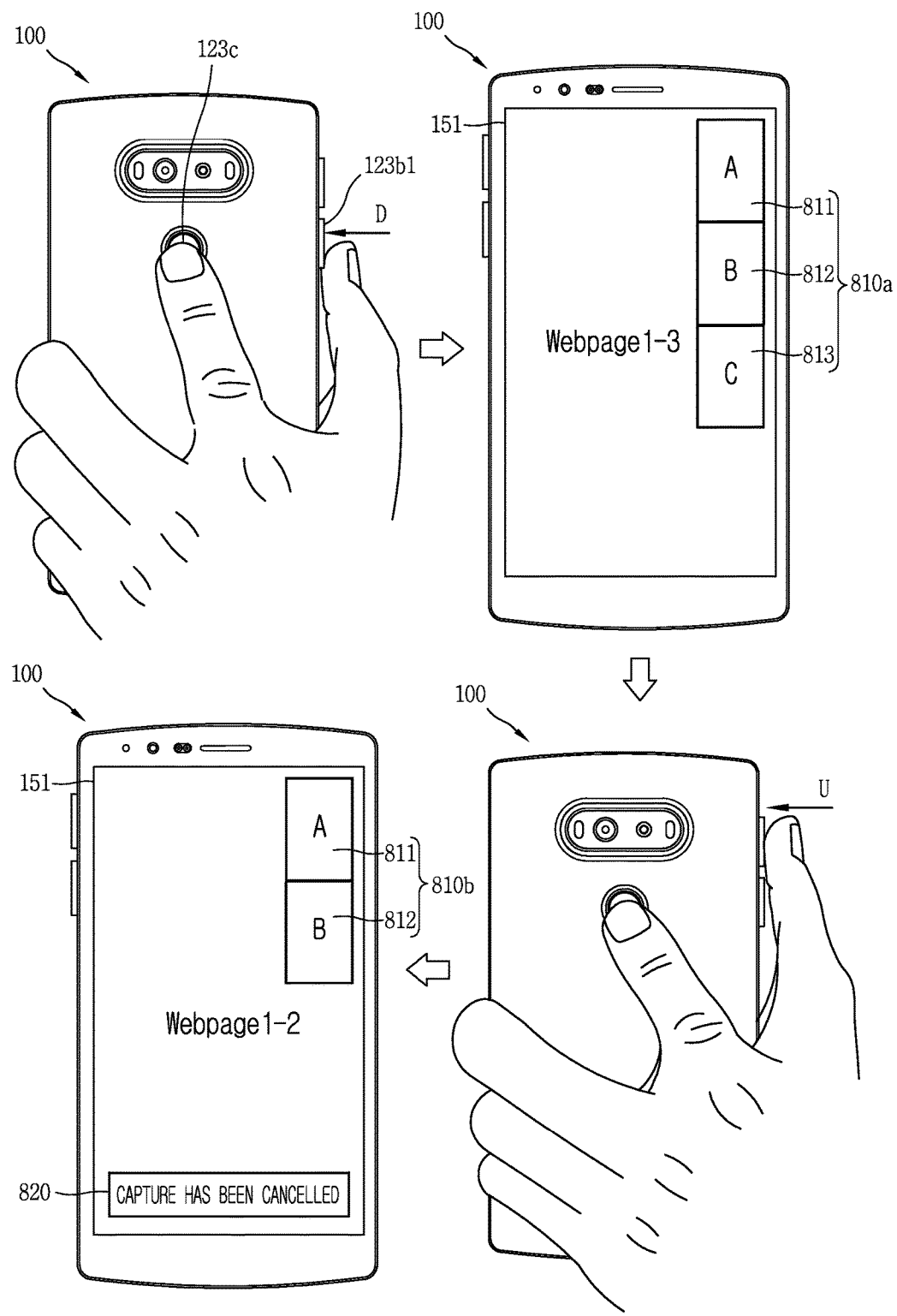

FIG. 8 illustrates an exemplary embodiment in which the capture of a captured area is rapidly cancelled by changing a combination of key inputs for executing a page capture.

Here, it is assumed that a key input for executing a page capture corresponds to an input of keys of a specific combination. Therefore, if the combination of key inputs is changed, the controller 180 of the mobile terminal 100 may perform another operation related to the page capture.

Specifically, if an input of keys of a first combination is received, the controller 180 may perform a screen capture while scrolling a page in a first direction. Here, the input of the keys of the first combination may mean, for example, a push input simultaneously applied to the volume-down key 123*b*1 provided at the side surface of the mobile terminal 100 and the rear surface key 123*c* provided at the rear surface of the mobile terminal 100.

Here, the first direction means a scroll direction of the page, corresponding to the direction in which the mobile terminal 100 is inclined. For example, if the mobile terminal 100 is inclined to the rear while the input of the keys of the first combination is being applied, the page is consecutively captured while being scrolled in the reverse direction. At this time, the reverse direction becomes the first direction. Alternatively, as shown in FIG. 8, if the mobile terminal 100 is not inclined, webpage 1 is consecutively captured while being scrolled in the forward direction. At this time, the forward direction becomes the first direction.

Referring to FIG. 8, the controller 180 sequentially captures displayed areas A, B, and C while scrolling the webpage 1 in the forward direction. Accordingly, a total of three consecutive captures are performed while a third area C is being displayed.

If an input of keys of a second combination different from the first combination is received while the page is being screen-captured while being scrolled in the first direction, the controller 180 executes a capture cancellation command for a previously captured area while scrolling the page in a second direction different from the first direction. Here, the input of the keys of the second combination may mean, for example, a push input simultaneously applied to the volume-down key 123*b*1 provided at the side surface of the mobile terminal 100 and the rear surface key 123*c* provided at the rear surface of the mobile terminal 100.

Here, the second direction may be a direction opposite to the current scroll direction of the page. As an example, when the page is consecutively captured while being scrolled in the forward direction, the reverse direction of the page may be the second direction. As another example, when the page is consecutively captured while being scrolled to the left direction, the second direction may be the right direction.

In FIG. 8, if a combination of the volume-down key 123b1 and the rear surface key 123c is changed to a combination of the volume-up key 123b2 and the rear surface key 123c while the webpage 1 is consecutively captured, a webpage section webpage 1-2 that was previously displayed is displayed while the webpage 1 is being rolling back in the second direction, i.e., the reverse direction. In addition, the capture of an area C captured last is cancelled. Thus, a thumbnail of the captured image C is disappeared from thumbnails 810a of the captured areas (810b).

Accordingly, the user can easily cancel a previously captured section even when a consecutive capture is performed beyond a user's desired section.

According to the exemplary embodiment, while the page is being consecutively captured, the controller 180 of the mobile terminal 100 connects thumbnails of a captured area and displays the connected thumbnails as one object on the display unit 151. In this case, the object may be displayed at a specific position, e.g., a side top end/side bottom end of the display unit 151, at which the object minimally covers a screen output on the display unit 151.

Meanwhile, in the present disclosure, when the direction of the consecutive capture of the page is set or changed by inclining the mobile terminal 100, the visibility of information may be deteriorated due to the reflection of light as the display unit 151 is inclined. Specifically, if the display unit 151 is inclined to the front/rear, information displayed at a lower/upper side of the display unit 151 is not viewed well due to structural characteristics of the display unit 151.

Figure 9A:
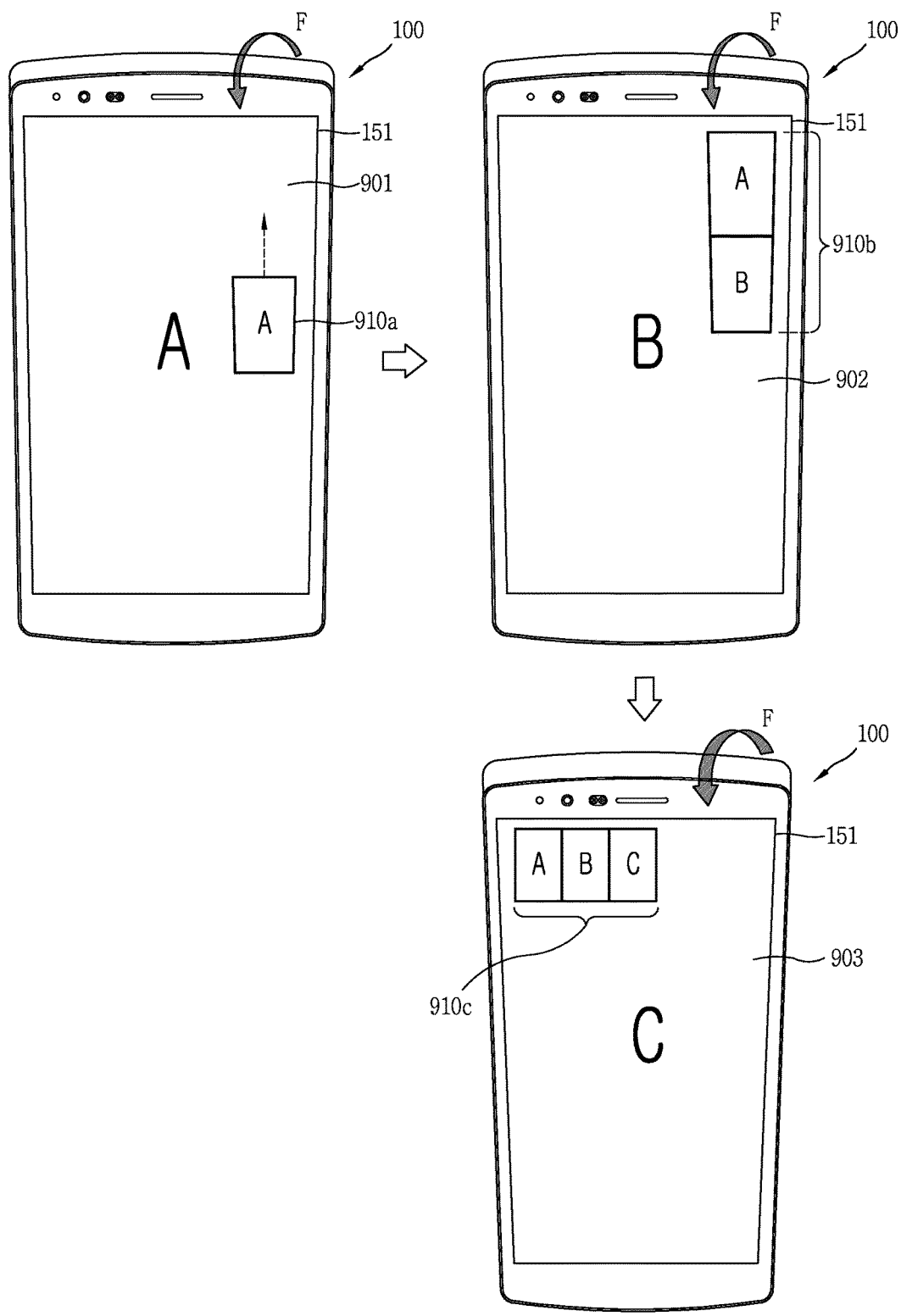
Figure 9B:
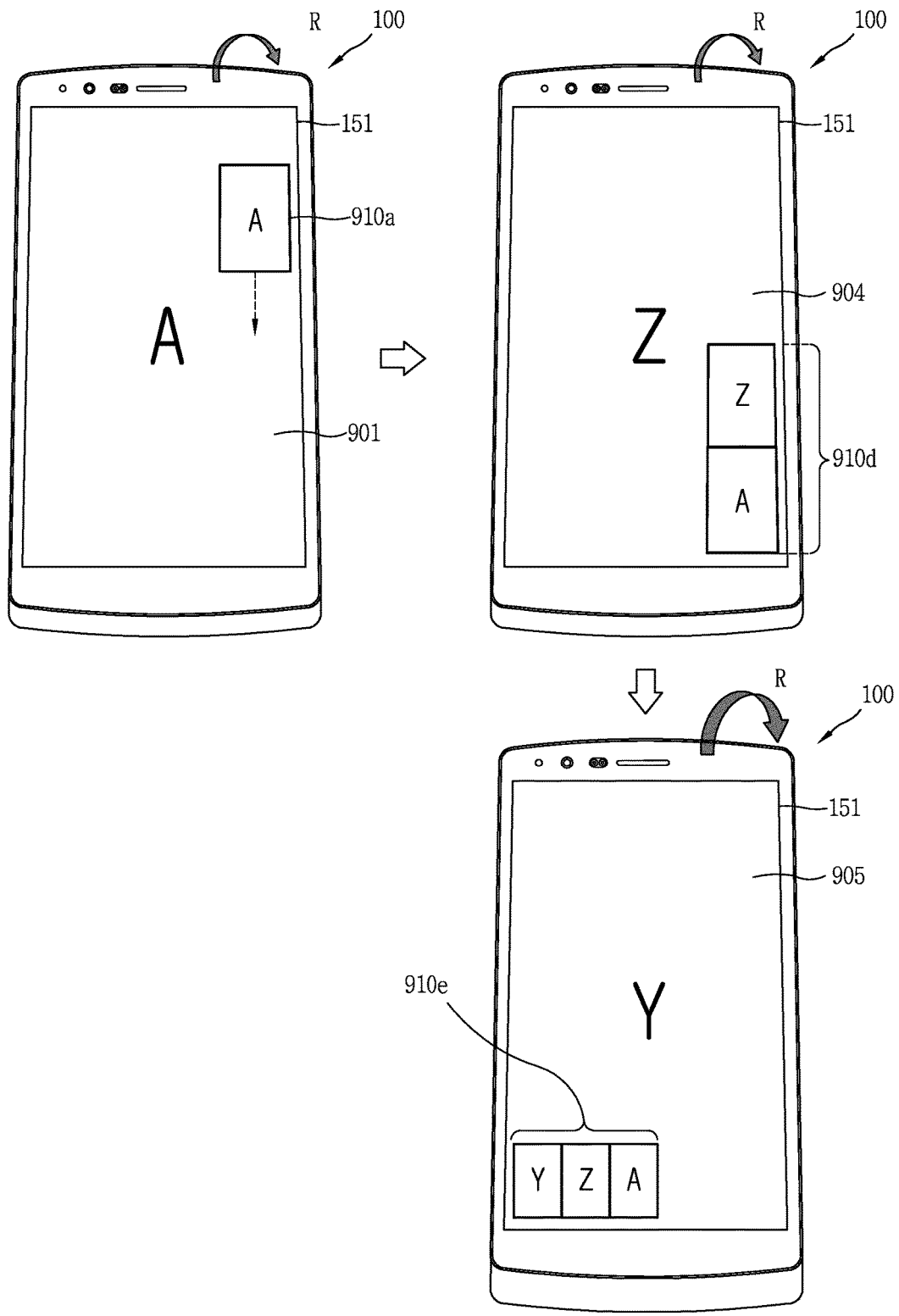

FIGS. 9A and 9B illustrate exemplary embodiments of a method for more visibly displaying thumbnails notifying a captured area when the capture speed of a page is adjusted by inclining the mobile terminal 100 or when the capture direction of the page is changed by inclining the mobile terminal 100.

Specifically, if at least one of the direction of an inclination of the main body of the mobile terminal 100 and the degree of the inclination is changed in a state in which an object including a thumbnail of a captured area is displayed, the controller 180 of the mobile terminal 100 may control the position or shape of the object including the thumbnail of the captured area to correspond to the changed direction and degree of the inclination.

In FIG. 9A, if the mobile terminal 100 is inclined to the front while a page is being consecutively captured, an object 910a notifying a captured area A may be moved to an upper side of the display unit 151 so as to improve visibility (910b). In this case, although not shown in this figure, the shape of the object 910a may also be changed so as to improve the visibility. For example, the shape of the object may be changed to a trapezoidal shape in which an upper side A of the object is wider than a lower side B of the object. Here, if the mobile terminal 100 is further inclined to the front, the object may be moved to the top end of the display unit 151, and may be deformed such that thumbnails of captured areas are connected in the lateral direction (910c).

In FIG. 9B, if the mobile terminal 100 is inclined to the rear while the page is being consecutively captured, the object 910a notifying the captured area A may be moved to a lower side of the display unit 151 so as to improve the visibility (910d). In addition, similarly to that described in FIG. 9A, if the mobile terminal 100 is further inclined to the rear, the object may be moved to the bottom end of the display unit 151, and may be deformed such that thumbnails of captured areas are connected in the lateral direction instead of the longitudinal direction (910e).

Figure 11:
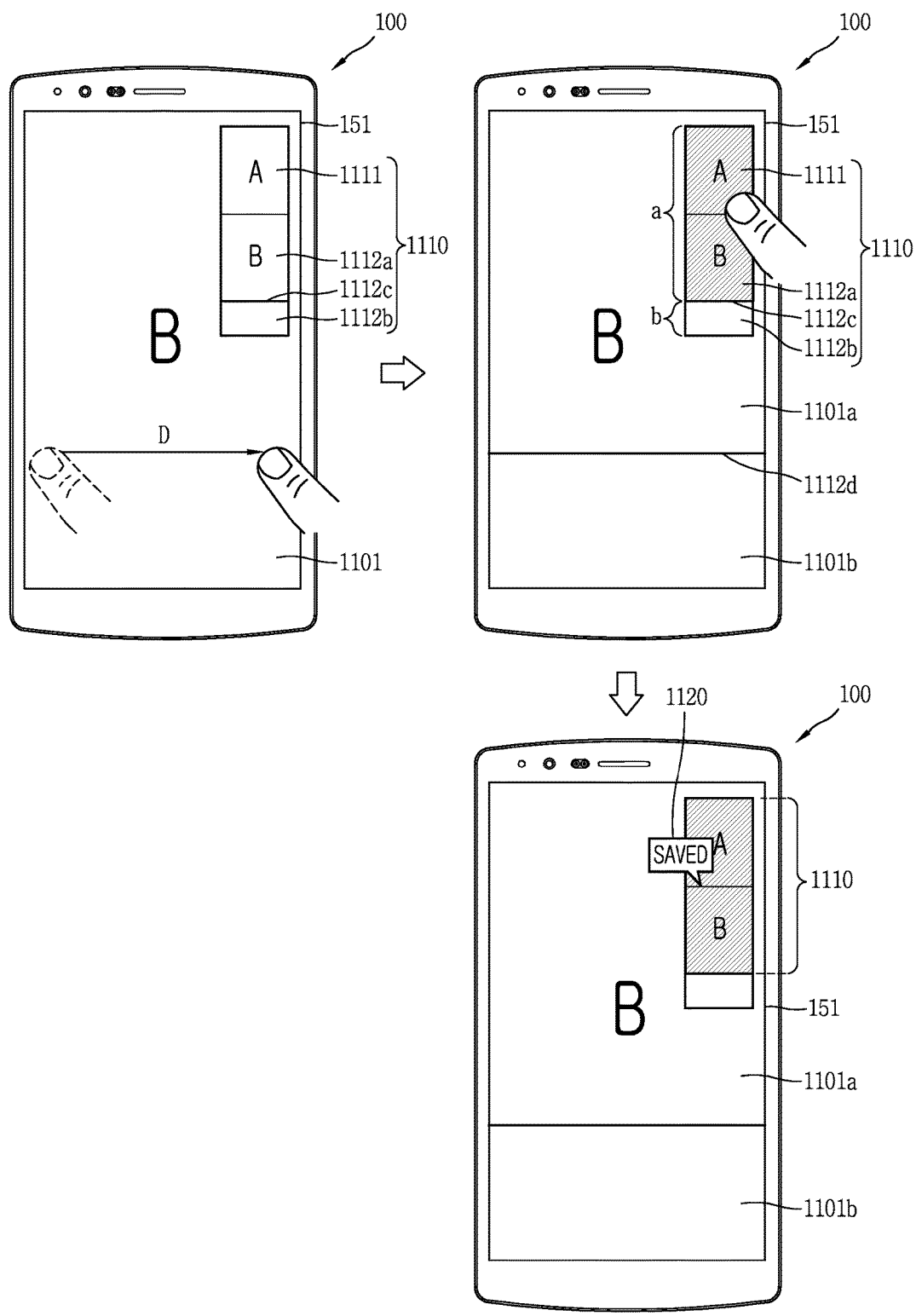
Figure 12:
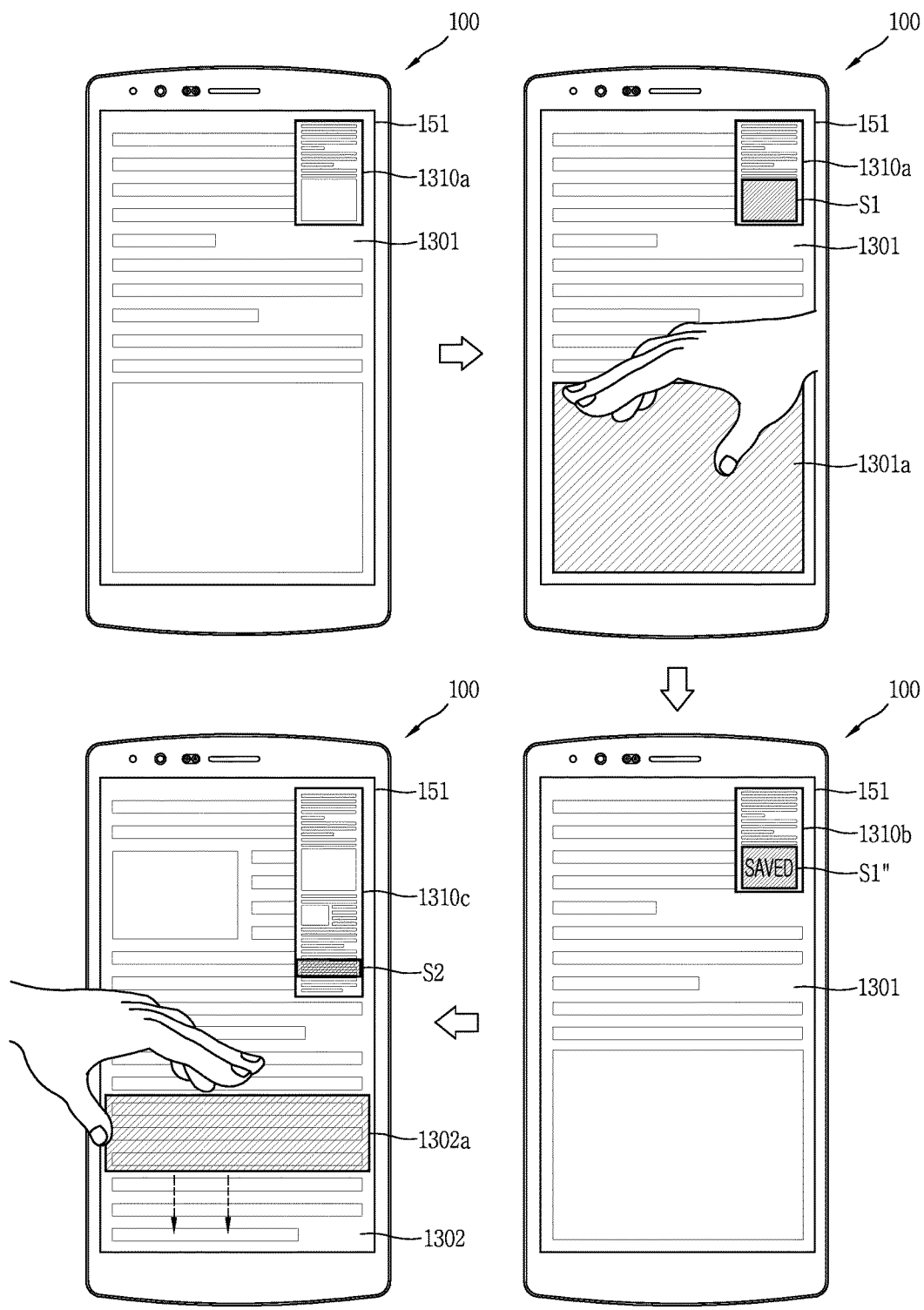

Hereinafter, FIGS. 10, 11, and 12 illustrate exemplary embodiments of easily editing an area captured based on a touch gesture while a page is being consecutively captured or after the consecutive capture of the page is ended.

First, FIG. 10 illustrates an exemplary embodiment of editing a captured area after the consecutive capture of a page is ended. In FIG. 10, if a key input for executing a page capture is released in a state in which a first area A, a second area B, and a third area C of a page are consecutively captured, the consecutive capture of the page is ended.

In this case, even after the consecutive capture is ended, a list 1010a including thumbnails 1011, 1012, and 1013 of the consecutively captured areas may be displayed in one area of a current area C 1001 of the page displayed on the display unit 151, e.g., at a right side for a preset time.

At this time, if a preset touch is applied to a specific thumbnail included in the list 1010a, the controller 180 may perform edition of a captured area corresponding to the corresponding thumbnail.

For example, as shown in FIG. 10, if the touch applied to a second thumbnail 1012 is flicked (or dragged) toward the outside/center of the display unit 151, a captured area corresponding to the thumbnail 1012 is actually deleted from the consecutively captured image while the second thumbnail 1012 is being deleted. In addition, if the second thumbnail 1012 is deleted from the list 1010a, a third thumbnail 1013 sticks to a first thumbnail 1011 like a magnet while being moved to the position of the deleted second thumbnail 1012. Accordingly, although a specific capture area is deleted, the connection state of consecutively captured images is continuously maintained.

For example, although not shown in this figure, if a long-touch input or a touch input exceeding a reference pressure is applied to a specific thumbnail, a currently displayed screen may be changed to a capture screen corresponding to the specific thumbnail, and image edition may be performed on the changed capture screen.

FIG. 11 is an exemplary embodiment of editing captured areas while a page is being consecutively captured.

In the exemplary embodiment, while a page is being screen-captured while being scrolled, the controller 180 may divide a screen-captured area into a first portion and a second portion, based on a preset touch gesture applied to the display unit 151. In FIG. 11, if a drag touch input is applied in a lateral direction toward the opposite side from one side of a second area B 1011 displayed on the display unit 151 when the second area B 1101 is captured while a page is being automatically scrolled, an upper portion ('first portion') and a lower portion ('second portion') of the second area B 1101 are visually divided using the touch trace of the drag touch input as a reference line D. The reference line D is a reference line that enables the first portion and the second portion to be differently processed. For example, the reference line D may correspond to the start or end line of the consecutive capture.

In addition, the generation condition of the reference line D may be created to a degree to which the length of the drag touch input in the lateral direction exceeds a reference range with respect to the width (or length) of the display unit 151. That is, if the degree of dragging of the touch input exceeds a predetermined range even though the touch input is not necessarily dragged from the end of one side to the opposite side of the display unit 151, the reference line D may be created. In FIG. 11, the reference line D in the lateral direction has been illustrated as an example, but it will be apparent that a reference line in the longitudinal direction may be created based on the touch trace of the drag touch input.

In addition, a display change corresponding to the first and second portions divided based on the reference line D is also shown in a list 1110 including thumbnails of the captured areas. For example, in FIG. 11, it can be seen that thumbnails 1111, 1112a, and 112b of the captured images A and B are divided into a first portion a and a second portion b with respect to a reference line 1112c.

Then, the controller 180 may perform edition on an area corresponding to any one of the first portion a and the second portion b, based on a preset touch gesture applied to the list 1110 including the thumbnails of the captured areas. For example, as shown in FIG. 11, if a touch is applied to a thumbnail area corresponding to the first portion a, only the corresponding sections 1111 and 1112a are saved as consecutive capture images while a slash-shaped indication is being shown at the first portion a. That is, the second portion b is deleted. In this case, a notification icon 1120 notifying that only the first portion a is saved may be popped up in the list 1110. On the other hand, in FIG. 11, if a touch is applied to the second portion b, only the corresponding section 1112b may be saved as a capture image while a slash-shaped indication is being shown at the second portion b.

As another exemplary embodiment, FIG. 12 illustrates an exemplary embodiment of selectively saving only partial information included in a displayed area using a specific touch gesture while a page is being consecutively captured.

Specifically, if a gesture of covering one area of a screen displayed on the display 151, i.e., a palm touch gesture is applied while a page is being screen-captured while being scrolled, the controller 180 may save only information selected through the corresponding gesture in the captured area. For example, in FIG. 12, if a palm touch gesture is applied to a specific portion 1301a in a currently displayed area 1301 while a page is being consecutively captured while being automatically scrolled, a selection indication is shown at the specific portion 1301a, and a highlight indication S1 is shown at a corresponding position of the specific portion 1301a in a list 1310a in which a thumbnail of the captured area is displayed. In this case, the auto scroll of the page may be temporarily stopped while the palm touch gesture is being applied.

After that, if the palm touch gesture is released, text information S1" notifying that only the specific portion 1301a has been selectively saved is displayed. In addition, the auto scroll and consecutive capture of the page that has been stopped is resumed. After that, if the palm touch gesture is again applied to a specific area 1302a in which texts are output, a block is created in the specific area 1302a selected by the palm touch gesture as the auto scroll of the page is stopped. In this case, the size of the created block may be expanded/reduced by applying a swipe input in a specific direction after the palm touch gesture is applied.

Meanwhile, although only a portion selected by the palm touch gesture is saved as described above, thumbnails of the areas consecutively captured while the page is being automatically scrolled are all displayed in lists 1310a, 1310b, and 1310c. However, if there is no additional input (e.g., an operation such as list selection), only portions S1 and S2 selected by the palm touch gesture are saved in the mobile terminal. In this case, only required information is continuously saved, and thus the user can identify desired information at a glance.

Figure 13:
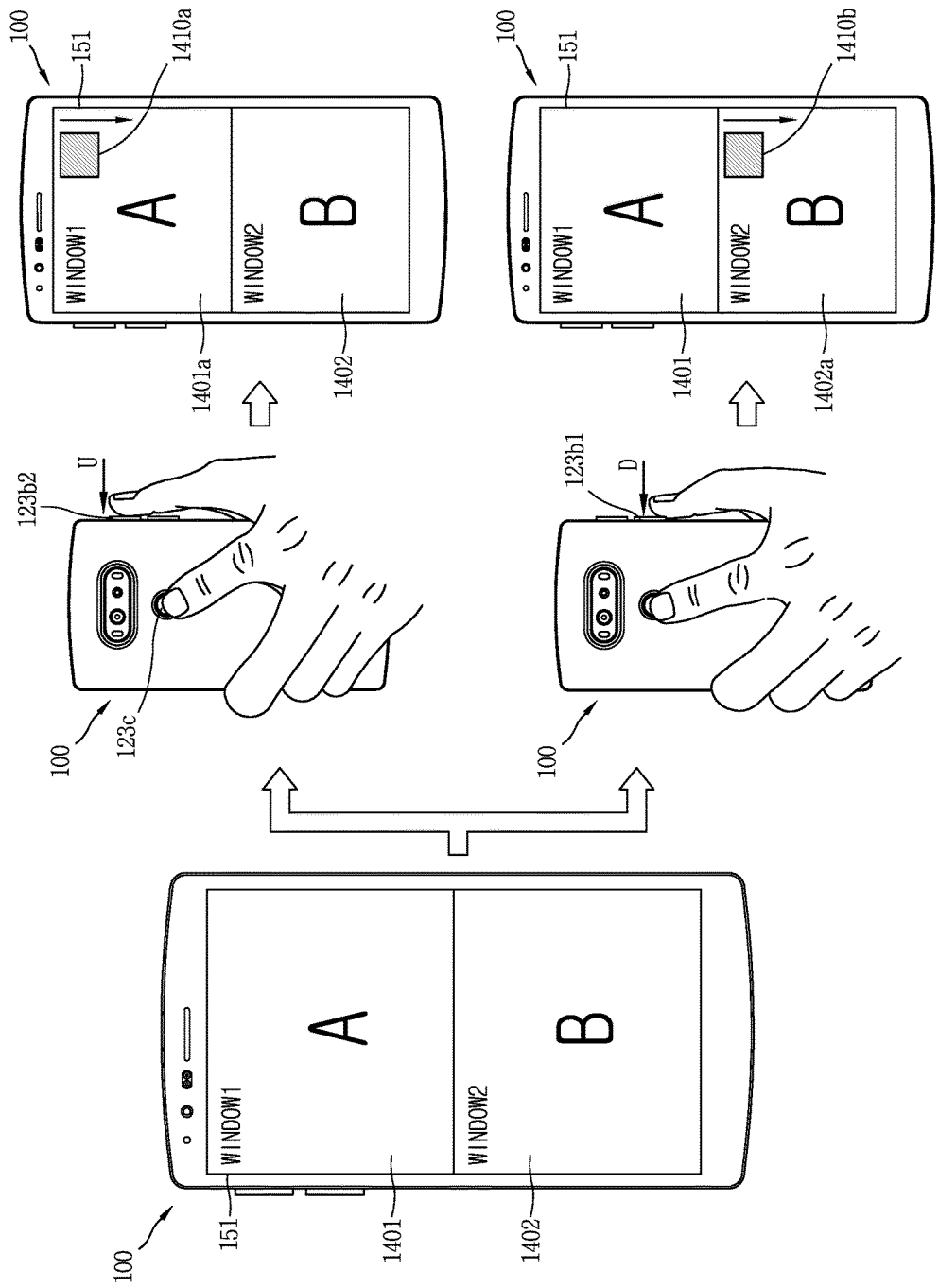

FIG. 13 illustrates an exemplary embodiment of a method in which, when a plurality of scrollable pages are displayed on the display unit 151, a consecutive capture is easily performed on each page.

As shown in FIG. 13, window 1 1401 and window 2 1402 may be displayed in the form of dual windows at upper and lower sides of the display unit 151, respectively. In addition, a page scrollable in the left-right/top-bottom direction may be displayed in at least one of the window 1 1401 and the window 2 1402.

In this state, if a screen capture is performed, areas A and B currently displayed in the window 1 1401 and the window 2 1402 are captured together. In order for the user to consecutively capture only any one of the window 1 1401 and the window 2 1402, a consecutive capture is to be performed after only one window in which a page to be consecutively captured is displayed is displayed on the display unit 151. Therefore, there is a problem in that the use of the dual windows is to be stopped. The problem is more complicated when the user desires to consecutively capture both of the window 1 1401 and the window 2 1402. Accordingly, FIG. 13 illustrates an embodiment of a method for easily and rapidly performing a consecutive capture on pages displayed on any one window or both of the dual windows while maintaining the use of the dual windows.

Specifically, in FIG. 13, among the plurality of keys provided at the side surface of the mobile terminal 100, the volume-up key U $123b2$ disposed at an upper side is matched to the manipulation window 1 1401 displayed at an upper side of the display unit 151, and the volume-down key D $123b1$ disposed at an upper side is matched to the manipulation of window 2 1402 displayed at a lower side of the display unit 151. That is, only a specific window of the dual windows is independently controlled based on inputs of keys of different combinations.

Accordingly, while a push input is being applied to the volume-up key U $123b2$ and the rear surface key $123c$ ('keys of a first combination'), which is disposed at the rear surface of the mobile terminal 100, only a page displayed in the window 1 1401 is consecutively captured while being scrolled. In addition, a thumbnail 1410a of the captured area is also created in only the window 1 1401. On the other hand, while a push input is being applied to the volume-down key D $123b1$ and the rear surface key $123c$ ('keys of a second combination'), only a page displayed in the window 2 1402 is consecutively captured while being scrolled. In addition, a thumbnail 1410b of the captured area is also created in only the window 2 1402.

Meanwhile, although not shown in this figure, when the page displayed in the window 1 is consecutively captured based on the direction of an inclination applied to the mobile terminal 100 and a degree of the inclination together with the keys of the first combination, the scroll direction and speed of the page may be differently controlled. In addition, it will be apparent that the manipulation of the window 2 matched to the keys of the second combination may be applied identically to the manipulation of the window 1.

Figure 14:
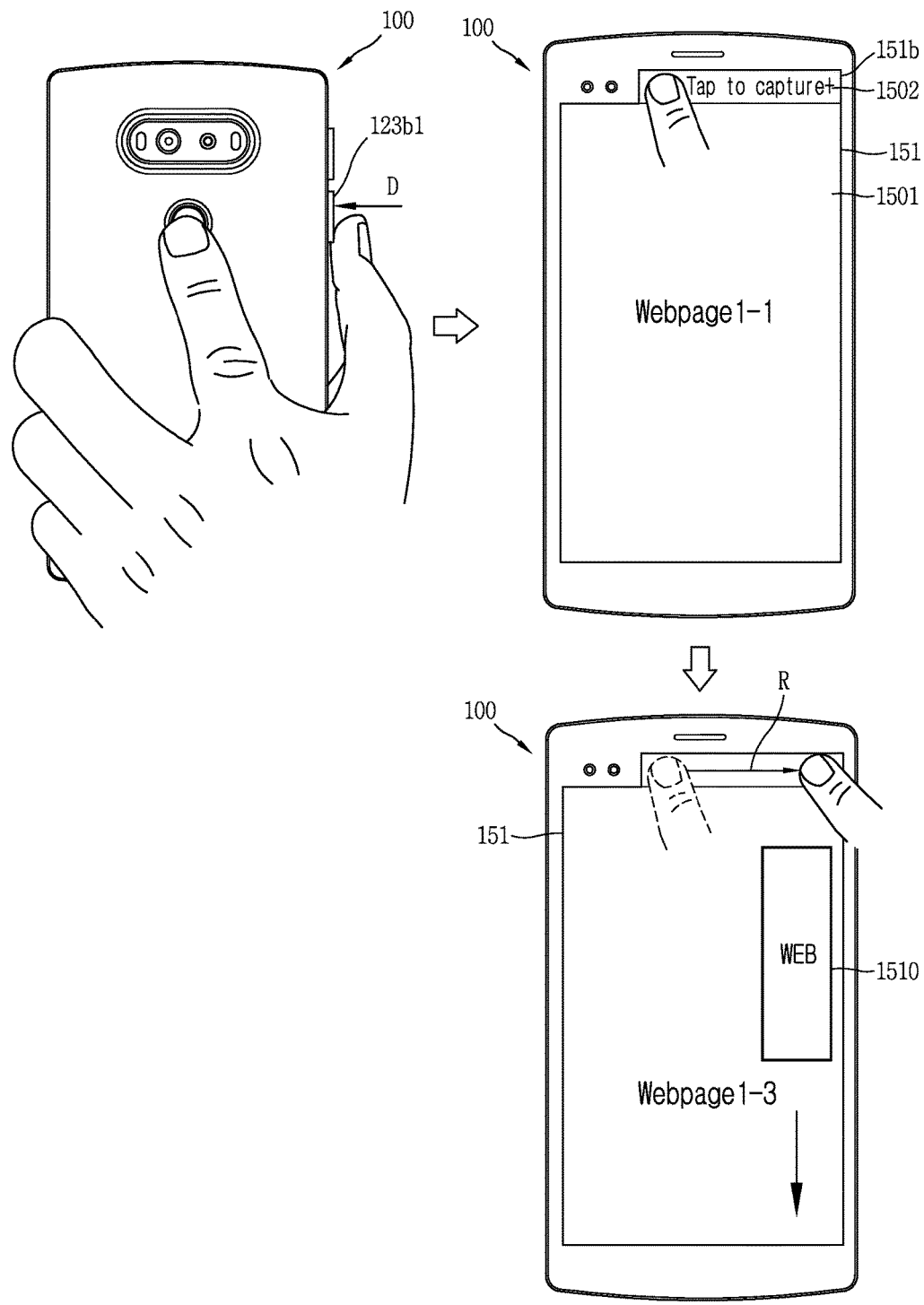

FIG. 14 illustrates an exemplary embodiment in which, when the display unit 151 of the mobile terminal 100 has an auxiliary display area 151b, a consecutive capture is easily performed using the auxiliary display area 151b. In FIG. 14, the auxiliary display area 151b extends upward from the main display area 151, but the present disclosure is not limited thereto. For example, the auxiliary display area 151b may be implemented to extend leftward/rightward/downward/rearward from the main display area 151.

If a push input is simultaneously applied to the volume-down key D 123b1 provided at the side surface of the mobile terminal 100 and the rear surface key 123c provided at the rear surface of the mobile terminal 100, the consecutive capture is performed from webpage 1-1 displayed on the display unit 151.

The controller 180 may control the scroll direction and scroll degree of the consecutive capture, based on the attribute of a drag touch input applied to the auxiliary display area 151b.

As an example, as shown in FIG. 14, when the drag touch input is applied to the auxiliary display area 151b in a direction from the left to right, the webpage 1-1 is consecutively captured while being scrolled in the forward direction. In addition, the consecutive capture is rapidly performed up to a section corresponding to the degree to which the drag touch input is dragged, and is then automatically ended. As another example, unlike FIG. 14, when the drag touch input is applied to the auxiliary display area 151b in a direction from the right to the left, the web-page 1-1 may be consecutively captured while being scrolled in the reverse direction.

In the above, the embodiments in which the scroll direction of a page to be consecutively captured is controlled based on the direction in which the mobile terminal 100 is inclined have been described. Hereinafter, a case where the scroll direction a consecutively captured page is controlled using different combinations of a plurality of keys for executing a page capture command, regardless of the direction in which the mobile terminal 100 is inclined, will be described as still another embodiment.

Here, combinations of a plurality of keys for performing the consecutive capture of the page may be different. Specifically, the capture of the page may be performed both when a push input is simultaneously applied to the volume-down key 123b1 disposed at the side surface of the mobile terminal 100 and the rear surface key 123c disposed at the rear surface of the mobile terminal 100 and when a push input is simultaneously applied to the volume-up key 123b2 disposed at the side surface of the mobile terminal 100 and the rear surface key 123c.

According to different combinations of the plurality of keys, a first capture signal for consecutively capturing the page while scrolling the page in a first direction may be generated, or a second capture signal for consecutively capturing the page while scrolling the page in a second direction may be generated. Here, the first direction and the second direction may be directions different from or opposite to each other.

If any one of the first and second capture signals is received, the controller 180 first captures a first area displayed on the display unit 151 and then extracts direction information included in the received capture signal, thereby determining a scroll direction of the page. For example, if the first capture signal corresponding to the combination of the volume-down key 123b1 and the rear surface key 123c is received, the 'bottom' may be extracted. When the page is scrollable in the top-bottom direction, the scroll direction of the page may be determined as the direction from the bottom to the top. When the page is scrollable in the left-right direction, the scroll direction of the page may be determined as the direction from the left to the right, i.e., the forward direction. After that, the controller 180 performs the consecutive capture while scrolling the page along the determined scroll direction.

Meanwhile, in an exemplary embodiment, when the combination of keys is changed while the page is being consecutively captured while being scrolled along the determined scroll direction, i.e., when the first capture signal is changed to the second capture signal while the first capture signal is being received, the controller 180 may perform a screen capture on the page by changing the scroll direction of the page to correspond to the second capture signal. According to the exemplary embodiment described above, the consecutive capture direction of a page can be easily selected and changed by merely applying a push input using different combinations of hard keys.

Meanwhile, although not shown in this figure, the controller 180 may control the auto scroll direction of the page, based on the direction of a touch gesture applied to the display unit 151, while the page is being consecutively captured while being scrolled.

As described above, in the mobile terminal and the method for controlling the same according to the present disclosure, the user can consecutively capture the entire page while scrolling the page in a desired direction instead of a predetermined direction. In addition, the user can capture the page by changing the scroll direction of the page at any time during the consecutive capture. In addition, the user can cancel a captured area during the consecutive capture, and only a desired portion in the captured area can be saved. Further, the manipulation for performing various operations related to the consecutive capture is intuitive and simple, thereby contributing to user's convenience.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
a body;
a display coupled to the body;
a user input unit;
a sensing unit configured to sense inclination of the main body relative to a reference plane and to sense direction of the inclination; and
a controller configured to:
cause the display to display a first area of a page;
screen-capture the first area when an input is received at the user input unit;
screen-capture a second area of the page consecutive to the screen-capture of the first area when the page is scrolled in a first direction determined according to the sensed direction of the inclination and while the input is being received at the user input unit, wherein the second area is an area being displayed next to the first area of the page;
screen-capture a third area of the page consecutive to the screen-capture of the first area when the page is rolled back in a second direction determined according to a change in the sensed direction of the inclination and while the input is being received at the user input unit, wherein the third area is a previously displayed area prior to the first area of the page; and
cause the display to display an image object including a thumbnail representative of at least a portion of the screen-captured first area, second area, and third area.

2. The mobile terminal of claim 1, wherein the screen-capture of the third area does not include any previously captured areas of the page.

3. The mobile terminal of claim 1, wherein the controller is further configured to:
display guide information related to screen capture corresponding to the sensed first or second direction when the first area of the page is displayed and the input is received at the user input unit.

4. The mobile terminal of claim 1, wherein the controller is further configured to:
cause the display to consecutively display a plurality of additional areas of the page when the page is continued to be scrolled in the first direction; and
screen-capture the plurality of additional areas of the page consecutive to the screen-capture of the first area when the page is continued to be scrolled in the first direction and while the input is being received at the user input unit.

5. The mobile terminal of claim 4, wherein the controller is further configured to:
stop the screen-capture of the plurality of additional areas when a preset gesture is input during the screen-capture of the plurality of additional areas.

6. The mobile terminal of claim 5, wherein the controller is further configured to:
cause the display to display an area of the page to be screen-captured next after the preset gesture is input to the body; and
restart the screen-capture of the plurality of additional areas when a further preset gesture input is received.

7. The mobile terminal of claim 5, wherein the controller is further configured to:
vary speed of the scrolling of the page according to a varying degree of the inclination.

8. The mobile terminal of claim 4, wherein the controller is further configured to:
continue the screen-capture of the plurality of additional areas of the page in the first direction when the input received at the user input unit includes a first key combination; and
stop the screen-capture of the plurality of additional areas of the page in the first direction, and screen-capture a plurality of additional areas of the page in a second direction, exclusive of screen-captured additional areas captured in the first direction, when the input received at the user input unit includes a second key combination that is different from the first combination.

9. The mobile terminal of claim 1, wherein the controller is further configured to:
cause the display to change at least one of a displayed position or shape of the image object in response to a change in degree of the sensed inclination or a change in the sensed direction.

10. The mobile terminal of claim 4, wherein the controller is further configured to:
stop the scrolling of the page and the screen-capture of the plurality of additional areas of the page when the input at the user input unit is released; and
permit user editing to the image object after the stopping of the scrolling of the page and the screen-capture of the plurality of additional areas of the page.

11. The mobile terminal of claim 4, wherein the controller is further configured to
divide one area of the plurality of additional areas into first and second portions while the page is continued to be scrolled in the first direction, wherein the dividing is in response to a touch received at the display, and wherein the first portion is included in the screen-captured plurality of additional areas and the second portion is not included in the screen-captured plurality of additional areas.

12. The mobile terminal of claim 1, wherein the controller is further configured to:
cause the display to display a graphic object notifying of direction and degree of the scrolling of the page corresponding to at least one of degree of the inclination or direction of the inclination.

13. The mobile terminal of claim 1, wherein the controller is further configured to:
cause the display to display another page by turning the page in a lateral direction relative to a viewing orientation in response to a touch input received at the display in the lateral direction; and
screen-capture the another page.

14. The mobile terminal of claim 1, further comprising:
a memory, wherein the controller is further configured to:
store in the memory the screen-captured areas in response to a received input.

15. A mobile terminal, comprising:
a display coupled to the body;
an input unit; and
a controller configured to:
cause the display to display a first area of a page;
screen-capture the first area when an input is received at the user input unit;
cause the display to scroll the page in a first direction and capture a second area of the page when the received input is a first key combination;
cause the display to scroll the page in a second direction different from the first direction and capture a third area of the page when the received input is a second key combination; and cause the display to display an image object including a thumbnail representative of at least a portion of the screen-captured areas, wherein the second area is an area being displayed next to the first area of the page and the third area is a previously displayed area prior to the first area of the page.

16. The mobile terminal of claim 15, wherein the controller is further configured to:

stop the scrolling of the page in the first direction and scroll the page in the second direction when the second key combination is input after the first key combination is input.

* * * * *